United States Patent
Jujjuri et al.

(10) Patent No.: US 11,741,050 B2
(45) Date of Patent: Aug. 29, 2023

(54) CLOUD STORAGE CLASS-BASED VARIABLE CACHE AVAILABILITY

(71) Applicant: salesforce.com, inc., San Francisco, CA (US)

(72) Inventors: Venkateswararao Jujjuri, Beaverton, OR (US); Nathaniel Wyatt, San Francisco, CA (US); Jameison Bear Martin, Oakland, CA (US); Patrick James Helland, San Rafael, CA (US)

(73) Assignee: Salesforce, Inc., San Francisco, CA (US)

( * ) Notice: Subject to any disclaimer, the term of this patent is extended or adjusted under 35 U.S.C. 154(b) by 2 days.

(21) Appl. No.: 17/162,501

(22) Filed: Jan. 29, 2021

(65) Prior Publication Data
US 2022/0245094 A1    Aug. 4, 2022

(51) Int. Cl.
*G06F 16/172* (2019.01)
*G06F 16/16* (2019.01)
(Continued)

(52) U.S. Cl.
CPC .......... *G06F 16/172* (2019.01); *G06F 16/148* (2019.01); *G06F 16/156* (2019.01); *G06F 16/164* (2019.01); *G06F 16/1824* (2019.01)

(58) Field of Classification Search
CPC .... G06F 16/162; G06F 16/172; G06F 16/164; G06F 16/1824; G06F 16/156; G06F 16/148
(Continued)

(56) References Cited

U.S. PATENT DOCUMENTS

| 6,014,666 A | 1/2000 | Helland et al. |
| 6,301,601 B1 | 10/2001 | Helland et al. |

(Continued)

FOREIGN PATENT DOCUMENTS

| AU | 2018290758 B2 | 8/2020 |
| AU | 2017356901 B2 | 12/2020 |

(Continued)

OTHER PUBLICATIONS

International Search Report and Written Opinion in PCT Appl. No PCT/US2022/070107 dated May 3, 2022, 15 pages.

*Primary Examiner* — Shahid A Alam
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to managing distributed storage of data for various entities according to classifications for these entities. A database node of a distributed storage system may receive, from a first entity of a plurality of entities, a request to store a set of data. The database node may further obtain metadata associated with the first entity, wherein the metadata specifies one of a plurality of classifications for the entities. The database node may provide the set of data to one or more of a plurality of caches for storage. The caches may be located in two or more availability zones and are configured to store the set of data based on the classification for the first entity identified in the metadata associated with the first entity. The database node may also store the set of data in a shared object storage coupled to the database node.

20 Claims, 18 Drawing Sheets

(51) Int. Cl.
*G06F 16/182* (2019.01)
*G06F 16/14* (2019.01)

(58) Field of Classification Search
USPC .......................................................... 707/736
See application file for complete search history.

(56) References Cited

U.S. PATENT DOCUMENTS

| | | | |
|---|---|---|---|
| 6,393,023 | B1 | 5/2002 | Shimizu et al. |
| 6,425,017 | B1 | 7/2002 | Dievendorff et al. |
| 6,490,630 | B1 | 12/2002 | Poon et al. |
| 6,631,425 | B1 | 10/2003 | Helland et al. |
| 6,678,696 | B1 | 1/2004 | Helland et al. |
| 6,714,962 | B1 | 3/2004 | Helland et al. |
| 6,748,417 | B1 | 6/2004 | Helland |
| 7,062,770 | B2 | 6/2006 | Limprecht et al. |
| 7,376,972 | B2 | 5/2008 | Konersmann et al. |
| 7,389,514 | B2 | 6/2008 | Russell et al. |
| 7,480,654 | B2 | 1/2009 | Jujjuri et al. |
| 7,529,859 | B2 | 5/2009 | Young et al. |
| 7,574,439 | B2 | 8/2009 | Everhart et al. |
| 7,627,759 | B2 | 12/2009 | Langworthy et al. |
| 7,634,777 | B2 | 12/2009 | Dievendorff et al. |
| 7,660,836 | B2 | 2/2010 | Bolik et al. |
| 7,774,219 | B1 | 8/2010 | Meredith et al. |
| 7,793,142 | B2 | 9/2010 | Clark et al. |
| 7,934,207 | B2 | 4/2011 | Gustafsson et al. |
| 8,041,676 | B2 | 10/2011 | Naineni et al. |
| 8,086,671 | B2 | 12/2011 | Helland et al. |
| 8,700,584 | B2 | 4/2014 | Ananthanarayanan et al. |
| 8,819,017 | B2 | 8/2014 | Zhou et al. |
| 8,886,672 | B2 | 11/2014 | Chaurasia et al. |
| 8,898,206 | B1 * | 11/2014 | Jiang ................... G06F 16/1827 707/827 |
| 8,918,862 | B2 | 12/2014 | Bhattiprolu et al. |
| 9,111,261 | B2 | 8/2015 | Bhalliprolu et al. |
| 9,251,003 | B1 * | 2/2016 | Gupta ................. G06F 11/1438 |
| 9,471,802 | B2 | 10/2016 | Beecham et al. |
| 9,542,403 | B2 | 1/2017 | Jujjuri et al. |
| 9,588,752 | B2 | 3/2017 | Bhalliprolu et al. |
| 9,892,274 | B2 | 2/2018 | French et al. |
| 10,158,642 | B2 | 12/2018 | Jujjuri et al. |
| 10,515,094 | B2 | 12/2019 | Wyatt et al. |
| 10,621,071 | B2 | 4/2020 | Martin et al. |
| 10,691,696 | B2 | 6/2020 | Helland et al. |
| 10,713,223 | B2 | 7/2020 | Jujjuri et al. |
| 10,862,957 | B2 | 12/2020 | Jujjuri et al. |
| 2005/0204139 | A1 | 9/2005 | Helland et al. |
| 2007/0011214 | A1 | 1/2007 | Jujjuri |
| 2008/0244031 | A1 | 10/2008 | Rai et al. |
| 2010/0318454 | A1 | 12/2010 | Warncke et al. |
| 2010/0319004 | A1 | 12/2010 | Hudson et al. |
| 2012/0016890 | A1 | 1/2012 | Bhalliprolu et al. |
| 2012/0323481 | A1 | 12/2012 | Bhalliprolu et al. |
| 2013/0151888 | A1 | 6/2013 | Bhalliprolu et al. |
| 2013/0262678 | A1 | 10/2013 | Tung et al. |
| 2014/0089557 | A1 | 3/2014 | Bhalliprolu et al. |
| 2015/0172120 | A1 * | 6/2015 | Dwarampudi .......... G06F 3/061 709/221 |
| 2016/0203445 | A1 | 7/2016 | Honsinger et al. |
| 2017/0262346 | A1 * | 9/2017 | Pradhan .............. G06F 11/1456 |
| 2018/0218023 | A1 | 8/2018 | Fanghaenel et al. |
| 2018/0329605 | A1 | 11/2018 | Venkateswararao |
| 2019/0045007 | A1 | 2/2019 | Wyatt et al. |
| 2019/0163613 | A1 | 5/2019 | Martin et al. |
| 2019/0236156 | A1 * | 8/2019 | Fanghaenel .......... G06F 16/172 |
| 2019/0278762 | A1 | 9/2019 | Chatterjee et al. |
| 2019/0324666 | A1 | 10/2019 | Kusters et al. |
| 2020/0081867 | A1 | 3/2020 | Muniswamy Reddy et al. |
| 2020/0201745 | A1 | 6/2020 | Martin et al. |
| 2020/0250155 | A1 | 8/2020 | Helland |

FOREIGN PATENT DOCUMENTS

| | | |
|---|---|---|
| EP | 1171817 B1 | 5/2003 |
| EP | 0823166 B1 | 1/2005 |
| EP | 0823164 B1 | 4/2005 |
| EP | 0823165 B1 | 4/2006 |
| EP | 3662390 A1 | 6/2020 |
| JP | 2006203951 A | 8/2006 |

* cited by examiner

US 11,741,050 B2

CLOUD STORAGE CLASS-BASED VARIABLE CACHE AVAILABILITY

BACKGROUND

Technical Field

This disclosure relates generally to a storage system and, more specifically, to replication and retrieval of data using a cache cluster and object storage.

Description of the Related Art

Modern database systems routinely implement management systems that enable users to store a collection of information in an organized manner that can be efficiently accessed and manipulated. In many cases, these database systems include database nodes and storage nodes that work together to implement database services. The database nodes often process database transactions to read and manipulate data while the storage nodes work to ensure that the results of those transactions are stored in a manner that can be efficiently accessed. The management systems also often seek to ensure that the data of a database system is sufficiently replicated across various zones to prevent data loss in the event that portions of the database system fail or become unavailable.

DETAILED DESCRIPTION

Figure 1A:
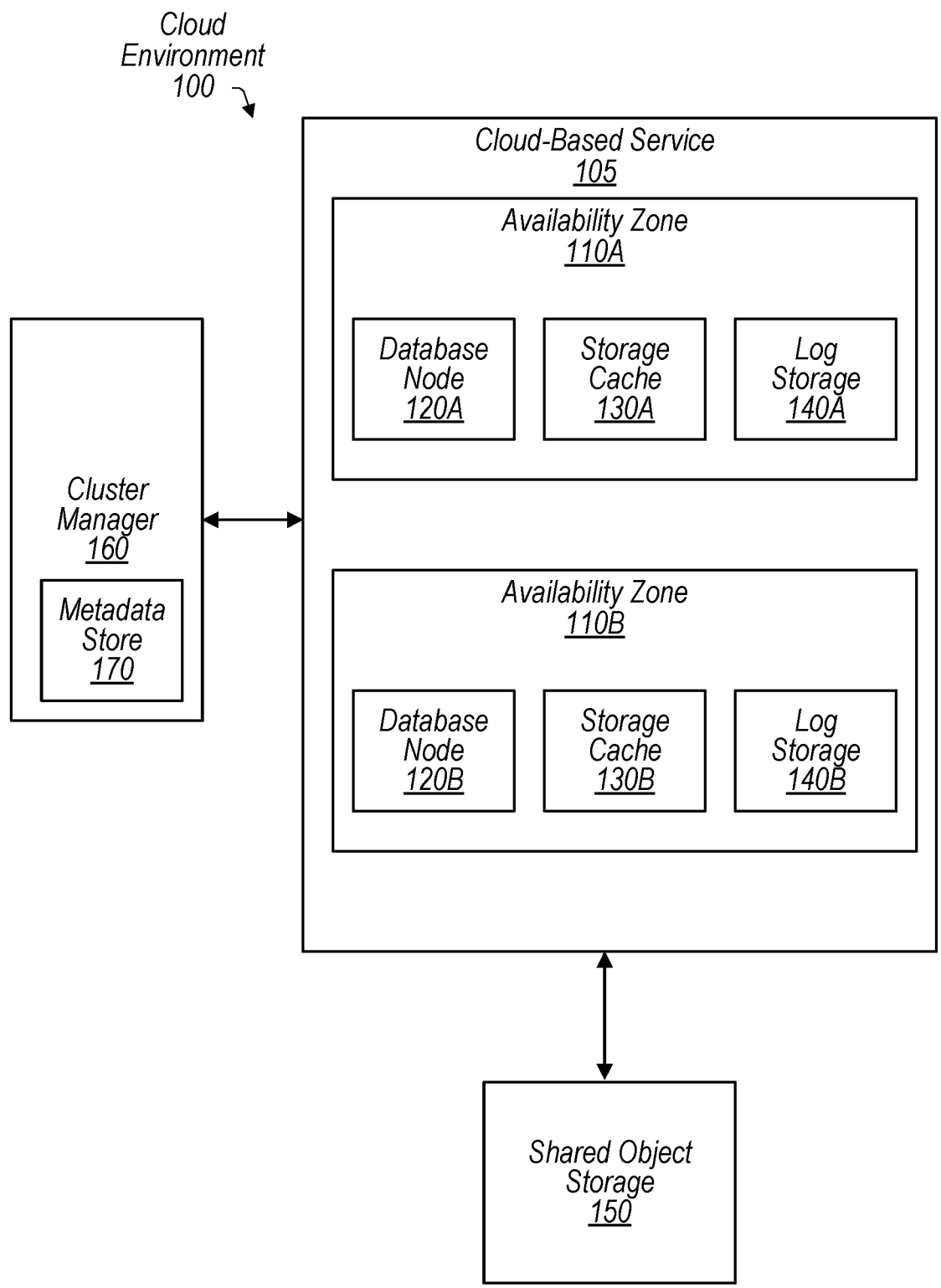
FIG. 1A is a block diagram illustrating example elements of a cloud environment, according to some embodiments.

Cloud computing services (or, simply the "cloud") are growing increasingly popular as companies seek to move their infrastructure into the cloud. As used herein, the term "cloud" is used in accordance with its well-understood meaning and refers to the on-demand availability of computer resources, such as data storage and computing power, that can be made available to one or more organizations over the Internet. One example of a public cloud is Amazon Web Services™ (AWS), which is provided by Amazon™ (the provider) to multiple companies (the organizations) to host and run their software. The resources of a public cloud (e.g., computing hardware, storage hardware, etc.) are often spread out over multiple geographic areas (termed "cloud regions"), with each cloud region having multiple, isolated networks of those resources (termed "availability zones"). A company may instantiate its software on computer systems located within a certain zone of a geographically appropriate cloud region.

As described herein, distributed database storage systems may store data in a data storage cluster that includes storage servers distributed across multiple availability zones. Data stored on the storage servers in each availability zone may be replicated across servers in additional availability zones for persistent data storage redundancy in the data storage cluster. In many cases, these storage servers are not natively designed for a public cloud; instead, the storage servers are designed for a single centralized network and thus have no concept of cloud regions or availability zones. Accordingly, a distributed database storage system that is distributed across multiple availability zones may not properly account for availability zone failures along with the latency and costs associated with communicating across zones in the cloud. For instance, in the event of a fault in an availability zone, data may be replicated across availability zones in response to the fault. Moving data across availability zones, however, may reduce performance as latency is increased when moving data across the availability zones. The reduced performance may be an issue for transactional databases, which need high performance (low latency) for fast access to data. Additionally, the cost for moving data across availability zones can be expensive. The present disclosure addresses at least this technical problem of replicating data without latency problems and the costs associated with moving data across availability zones.

The present disclosure describes various techniques for enabling cloud-based services to move data across availability zones by integrating the utilization of ephemeral storage caches (such as internal non-volatile memory (NVMe) based storage) and a shared object storage (such as Amazon S3™). Shared object storage provides cost-effective, durable, and scalable storage for persistent data. Shared object storage, however, does not have the performance capabilities needed for transactional databases (such as low latency for fast access to data). Ephemeral storage caches provide low latency data transfer but are temporary storages in which data is lost in the event of a power failure or other failure event. Thus, the present disclosure contemplates techniques to provide low-cost, low latency, and durable persistent storage for distributed database storage systems such as systems providing transactional database storage.

In various embodiments described below, a cloud-based storage service has multiple storage caches instantiated across multiple availability zones in front of a shared object storage. The storage caches may be instantiated in a data storage cluster with storage caches distributed across multiple availability zones for replication and availability of data across the availability zones. Each availability zone is separately capable of writing data to and reading data from the shared object storage. The shared object storage behind the data storage cluster provides replicated storage for data in the data storage cluster that is persistent and durable. In various cases, an orchestration service or cluster manager, such as Kubernetes™ or Apache Zookeeper™, is used to instantiate the storage caches within the different availability zones. In various embodiments, the availability zones include a database node, further described herein. The database node handles the retrieval, manipulation, and storage of data for the data storage cluster. For example, the database node may write the data into both a storage cache and the shared object storage in response to a request to store data in the cloud-based storage service. The database node may retrieve data from the storage cache in response to a data retrieval request to provide fast data retrieval by taking advantage of the low latency of the storage cache. The shared object storage provides backup of the data in case of failure of the storage cache.

These techniques can be advantageous as they allow for low latency data retrieval while providing persistent data storage to prevent the loss of data. Additionally, these techniques provide for low latency and low-cost movement of data within the cloud environment. For instance, data lost in a storage cache may be directly retrieved from the shared object storage rather than another storage cache as the cost of data retrieval from the shared object storage is typically less than the cost of moving data across availability zones. Moreover, the shared object storage may be used to populate data across availability zones rather than populating from one availability zone to another. For instance, replacement data for older or invalid data in one availability zone may be retrieved from the shared object storage after identification of newer or valid data in another availability zone, the newer or valid data having also been stored in the shared object storage. An exemplary application of these techniques will now be discussed, starting with reference to FIG. 1A.

Turning now to FIG. 1A, a block diagram of example elements of a cloud environment 100 is shown. Cloud environment 100 includes a set of components that may be implemented via hardware or a combination of hardware and software. In the illustrated embodiment, cloud environment 100 includes cloud-based service 105 that includes availability zones 110A and 110B. Cloud environment 100, in various embodiments, is a cloud infrastructure that includes various components (e.g., hardware, virtualized resources, storage, and network resources) for providing cloud computing services to users. In some embodiments, cloud environment 100 is spread across multiple geographical locations and each location may define a "region" of cloud environment 100. A region may include a set of data centers that can be clustered together. Within a region, there may be one or more availability zones 110.

As used herein, the term "availability zones" refers to two or more cloud areas that are geographically separated and across which data is replicated. Availability zones 110 may be located in the same region or they can be in separate regions. An availability zone 110, in various embodiments, is a logical or physical grouping of components (e.g., computing resources, storage resources, etc.) within a region. In many cases, the components of a given availability zone 110 are isolated from the failures of components in other availability zones 110. For example, availability zone 110A may be a first data center in a certain region and availability zone 110B may be a second data center in the same region. Availability zone 110A may be isolated such that a failure at the data center of availability zone 110B does not affect the data center of availability zone 110A. In some cases, availability zones 110A and 110B might be the same data center, but correspond to components on separate networks such that one availability zone 110 might not be affected by the other availability zone 110.

Figure 4:
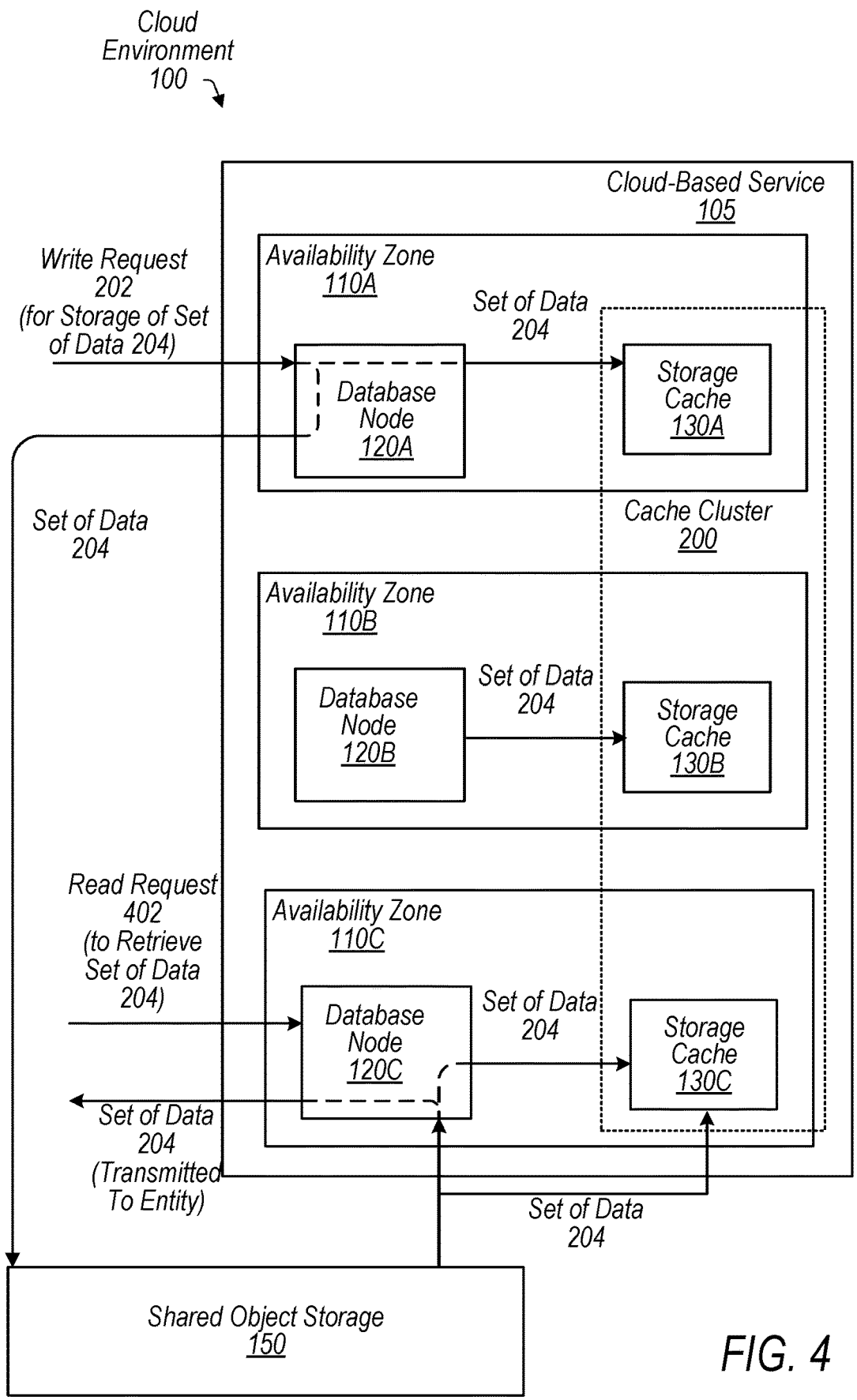
FIG. 4 depicts a block diagram illustrating example elements of a cloud environment including a cloud-based service with three availability zones configured to handle write and read requests to the cloud-based service, according to some embodiments.

In various embodiments, a data storage cluster (e.g., a cache cluster or a storage cluster, described herein) is distributed across two or more availability zones 110 with data replicated between availability zones. Data may be replicated across the availability zones to provide data redundancy between the availability zones. In certain embodiments, availability zones 110 are separated geographically by some distance such that an external failure in one availability zone (e.g., a power failure or natural disaster) does not affect another availability zone and stored data is still available for retrieval. In the context of cloud-based service 105, availability zones 110 may sometimes be referred to as "computer zones". It is to be understood that while the illustrated embodiment of FIG. 1A and various embodiments described herein depict two availability zones 110A and 110B, cloud-based service 105 may include any plural number of availability zones. For instance, in many contemplated embodiments, cloud-based service 105 includes three availability zones 110, as shown in FIG. 4.

In certain embodiments, database nodes 120, storage caches, 130, and log storages 140 are distributed across availability zones 110. In the illustrated embodiment, availability zone 110A includes database node 120A and availability zone 110B includes database node 120B. As used herein, the term "database node" refers to a component that handles storage, retrieval, and manipulation of data in cloud environment 100. A database node may be, for example, a component that is implemented by an application running on a server in cloud environment 100. For instance, database nodes 120 may be software routines executable by applications running on servers that are collocated in availability zones 110 along with storage caches 130 and log storages 140. Thus, database nodes 120 may interface with storage caches 130, log storages 140, and shared object storage 150 to handle storage, retrieval, and manipulation of data in cloud environment 100. For example, database nodes may provide requests to storage cache 130, log storage 140, or shared object storage 150 for the reading and writing of data on behalf of cloud-based service 105.

In various embodiments, database nodes 120 are instantiated in cloud environment 100 by cluster manager 160. In certain embodiments, at least one database node 120 is instantiated in each availability zone 110 such that an instance of a database node exists in each availability zone. The one or more database nodes 120 in availability zones 110 may implement a database (e.g., a distributed database storage system) that may be used by other applications for the storage and query of data. Distributing database nodes 120 across each availability zone 110 provides redundancy of the database node between the availability zones. Thus, in case of failure of a database node in one availability zone, a database node in another availability zone may be available to replace the failed database node. For example, database node 120A in availability zone 110A may be capable of interfacing with storage cache 130B or log storage 140B in availability zone 110B in the event database node 120B fails.

In some embodiments, database nodes 120 are instantiated on multiple servers within availability zones 110 to provide redundancy within the availability zones. In such embodiments, a primary instance of a database node is running on one server in the availability zone with duplicates of the database node instantiated on additional servers as backup. Thus, in the case of failure of the primary instance of the database node, a backup (secondary) instance of the database node may be activated to replace the failed primary instance.

In some embodiments, only one database node 120 is instantiated in cloud environment 100 such that only one instance of a database node exists across availability zones 110. In various embodiments, only one instance of a database node 120 across availability zones 110 is active as the primary instance while inactive (duplicate) database nodes reside in other availability zones (or in the same availability zone). Thus, an inactive (duplicate) database node in any availability zone (e.g., another availability zone or the same availability zone) may be activated in the instance of failure of the primary instance of the database node to provide redundancy for database node operation.

Figure 1B:
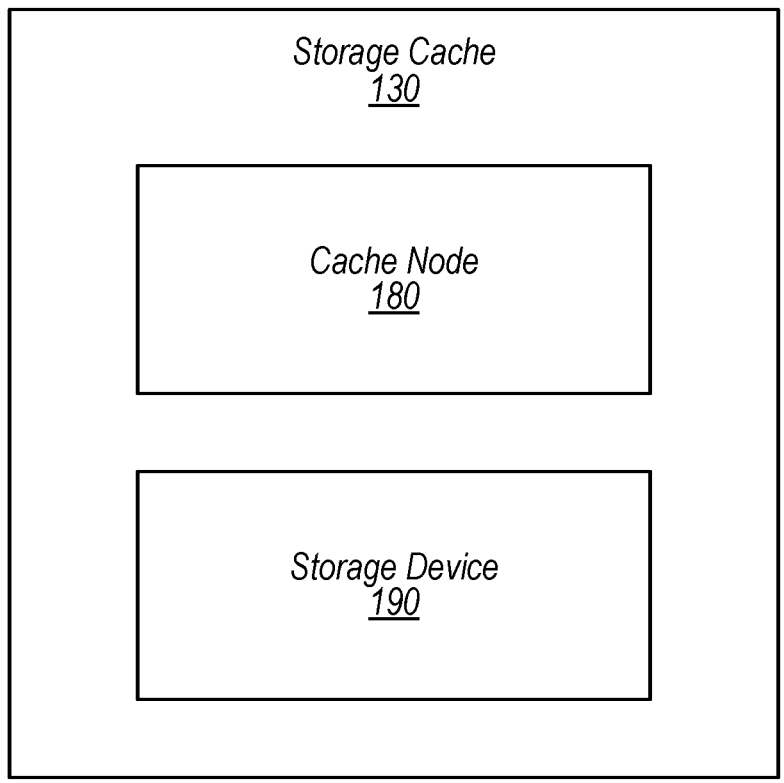
FIG. 1B depicts a block diagram illustrating an example of a storage cache, according to some embodiments.

In the illustrated embodiment, availability zone 110A includes storage cache 130A and availability zone 110B includes storage cache 130B. FIG. 1B depicts a block diagram illustrating an example of a storage cache 130, according to some embodiments. As used herein, the term "storage cache" refers to an ephemeral (temporary) cache for storage of data. For example, storage cache 130 may include internal non-volatile memory (e.g., NVMe) based storage. In various embodiments, storage cache 130 includes cache node 180 (e.g., a storage node) and storage device 190. In certain embodiments, cache node 180 is a set of software routines executable to implement storage cache 130, which is capable of providing storage functionality in cloud-based service 105. In some embodiments, the hardware used to execute the set of software routines is considered a part of cache node 180. Cache node 180 may receive requests to read and write data on behalf of cloud-based service 105 and, in various instances, specifically on behalf of its storage cache 130. As an example, cache node 180 may receive a request to write or read data stored on storage device 190.

In certain embodiments, storage device 190 is a data storage element where the data is maintained in storage cache 130. In various embodiments, storage device 190 is an ephemeral (temporary) cache storage element such as internal non-volatile memory (e.g., NVMe) based storage. Other embodiments of a cache storage element may also be contemplated such as, but not limited to, volatile memory based storage. In certain embodiments, storage device 190 includes multiple servers (e.g., server blades with internal non-volatile memory) collocated with a database node 120 in an availability zone 110 where the servers collectively and in combination with cache node 180 provide storage cache 130. In some embodiments, storage caches 130 are instantiated by database nodes 120. In various embodiments, storage caches 130 provide low latency data transfer but are typically susceptible to losing data when power loss or failure occurs.

In various embodiments, storage caches 130 are implemented as caches for data that is stored in shared object storage 150. A storage cache 130 may receive requests to read and write data on behalf of cloud-based service 105 and, in various instances, specifically on behalf of its availability zone 110. As an example, storage cache 130A may receive a request from database node 120A to return data stored on servers making up storage cache 130A. In various embodiments, storage caches 130, along with database nodes 120, implement data replication practices such that data stored by one storage cache 130 is stored by at least one other storage cache 130. For example, the data stored by storage cache 130A may be stored by storage cache 130B. In some cases, portions of that data may be stored on different storage caches 130 such that a complete copy is not maintained by a single storage cache 130. In various embodiments, stored data is replicated across different availability zones 110 such that if one availability zone 110 becomes unavailable, the data is still accessible through another availability zone 110; or if a certain portion of cloud-based service 105 on an availability zone 110 becomes unavailable, the data can be accessed through another potion of cloud-based service 105.

In the illustrated embodiment, availability zone 110A includes log storage 140A and availability zone 110B includes log storage 140B. As used herein, the term "log storage" refers to storage elements used to store a log of the transactions (e.g., storing and retrieving) over time involving the data managed in cloud-based service 105 (e.g., data being stored in and retrieved from storage caches 130). In some embodiments, log storages 140 are instantiated by database nodes 120. As shown in the illustrated embodiment, log storage 140A corresponds to availability zone 110A and storage cache 130A while log storage 140B corresponds to availability zone 110B and storage cache 130B. Thus, in certain embodiments, log storage 140A stores a log of transactions associated with availability zone 110A and storage cache 130A while log storage 140B stores a log of transactions associated with availability zone 110B and storage cache 130B.

In some embodiments, log storages 140 may store copies of the data managed in cloud-based service 105. For example, a log storage 140 may store a copy of the data along with the record of the log. In some embodiments, copies of the data stored in log storages 140 may be used to recover data in the event of a problem in one of the other storage elements (e.g., storage caches 130 or shared object storage 150). In certain embodiments, log storages 140 include persistent data storage elements where logs and data are maintained in the event of power loss or failure. For example, log storages 140 may include block storage elements such as elastic block storage (EBS) elements. In various embodiments, log storage 140 implements a set of software routines executable to provide storage functionality in cloud-based service 105 that corresponds to the functionality implemented in storage cache 130. For example, log storage 140 may implement data replication practices such that data stored by one log storage 140 is stored by at least one other log storage 140.

As shown in FIG. 1A, cloud environment 100 includes shared object storage 150. As used herein, the term "shared object storage" refers to persistent data storage for objects that can be shared across resources. One example of a shared object storage is Amazon S3™ from Amazon Web Services™ (AWS). In certain embodiments, shared object storage 150 implements a web service interface to allow the storage and retrieval of any amount of data with high bandwidth. The data may be stored and retrieved at anytime from anywhere on the web. In some instances, shared object storage 150 only incurs costs for transactions of data and not for the amount of data transferred. Thus, any amount of data may be stored or retrieved in a single transaction based on the same cost. In various embodiments, cloud-based service 105 interfaces with shared object storage 150 for storage and retrieval of data managed by the cloud-based service. For example, as described herein, database nodes 120 in availability zones 110 may interface with shared object storage 150 either to provide data to the shared object storage for storage or to retrieve data from the shared object storage. In certain embodiments, shared object storage 150 is implemented as a main data storage by database nodes 120 while storage caches 130 are implemented as local, low latency data storages for subsets of the data stored in shared object storage 150.

In the illustrated embodiment, cloud environment 100 includes cluster manager 160 with metadata store 170. As used herein, the term "cluster manager" refers to a centralized management or orchestration service that facilitates the deployment of cloud-based service 105 using the resources of availability zones 110 and shared object storage 150. In various embodiments, cluster manager 160 includes a set of software routines executable to provide the management or orchestration service. Kubernetes™ and Apache Zookeeper™ are examples of cluster managers. Cluster manager 160 may deploy containerized applications that implement cloud-based service 105. In some embodiments, cluster manager 160 is associated with a region and thus is responsible for facilitating deployments within the availability zones 110 of that region. As shown in FIG. 1A, for example, cluster manager 160 interfaces with both availability zone 110A and availability zone 110B and thus can facilitate the deployment of database nodes 120, storage caches 130, and log storages 140 within those availability zones 110. While cluster manager 160 is depicted separately from availability zones 110, in various embodiments, cluster manager 160 is instantiated within an availability zone 110 (e.g., availability zone 110A). Though, cluster manager 160 might be instantiated in one of the availability zones 110, cluster manager 160 may still facilitate deployments within other availability zones 110 (e.g., availability zone 110B). In some embodiments, however, cluster manager 160 may facilitate deployments within only its own availability zone 110. Accordingly, multiple cluster managers 160 may be instantiated in order to manage deployments for each availability zone 110 and to allow for cloud-based service 105 to be distributed across those availability zones 110.

In various embodiments, cluster manager 160 maintains resource information that describes the resources (e.g., processors, storage devices, network ports, servers, virtual machines, etc.) of availability zones 110 that are accessible to cluster manager 160 for deploying cloud-based service 105. Cluster manager 160 may receive deployment requests (e.g., from an admin of an organization) to deploy cloud-based service 105. In various embodiments, a deployment request includes a specification describing what type of cloud-based service 105 to deploy and how it should be deployed (e.g., a storage service or cluster should be deployed across at least two availability zones 110). Based on receiving a deployment request, cluster manager 160 may consider the requirements of the specification and the availability zone resources available to it for meeting those requirements. Cluster manager 160 may then attempt to deploy the requested cloud-based service 105 using resources of availability zones 110. In various embodiments, cluster manager 160 stores location information that describes the locations where cluster manager 160 has instantiated components of cloud-based service 105. As an example, the information may indicate that storage cache 130A of the illustrated cloud-based service 105 is instantiated on resources of availability zone 110A.

In certain embodiments, cluster manager 160 maintains information for various elements of cloud-based service 105, such as the health of database nodes 120, storage caches 130, and log storages 140, as well as metadata used by the various nodes to determine how to handle requests from various entities for data. In certain embodiments, metadata is stored in metadata store 170, which is instantiated in cluster manager 160. Metadata store 170, in various embodiments, is a repository that stores metadata, which can pertain to the operation of cloud-based service 105. The metadata may specify, for example, the locations where particular data has been stored in cloud-based service 105. As an example, the metadata may specify that records for a particular key range are stored at storage caches 130A and 130B. Metadata store 170 may be accessible to various components of cloud environment 100, including database nodes 120. In some embodiments, cloud environment 100 is implemented differently than shown in FIG. 1A. For example, cluster manager 160 and metadata store 170 may be implemented using nodes within availability zones 110A and 110B. As another example, metadata store 170 might be distributed across availability zones 110A and 110B such that metadata is available locally to a specific availability zone 110.

In various embodiments, cloud-based service 105 is a service or system that provides a set of functionalities and is deployable on the cloud infrastructure of cloud environment 100. Cloud-based service 105 may include, for example, a distributed storage service, a database management system, an e-mail service, a web application server, etc. In various embodiments, cloud-based service 105 is implemented by executing a set of program instructions. As such, cluster manager 160 may deploy cloud-based service 105 to one or more availability zones 110 by causing its corresponding program instructions to be executed on the resources of those availability zones 110. In the illustrated embodiment, cloud-based service 105 is a storage service having multiple storage caches 130 that have been instantiated across availability zones 110A and 110B. In some cases, storage caches 130 of cloud-based service 105 may form one or more clusters (e.g., cache clusters), as described herein. In the cache clusters, the storage caches 130 of a certain cluster act on behalf of that cluster. For example, storage caches 130A and 130B may form a cache cluster such as cache cluster 200, shown in FIG. 2. In some cases, log storages 140 of cloud-based service 105 may form one or more clusters (e.g., log storage clusters), as described herein. In the log storage clusters, the log storages 140 of a certain cluster act on behalf of that cluster. For example, log storages 140A and 140B may form a log storage cluster such as log storage cluster 500, shown in FIG. 5.

Figure 2:
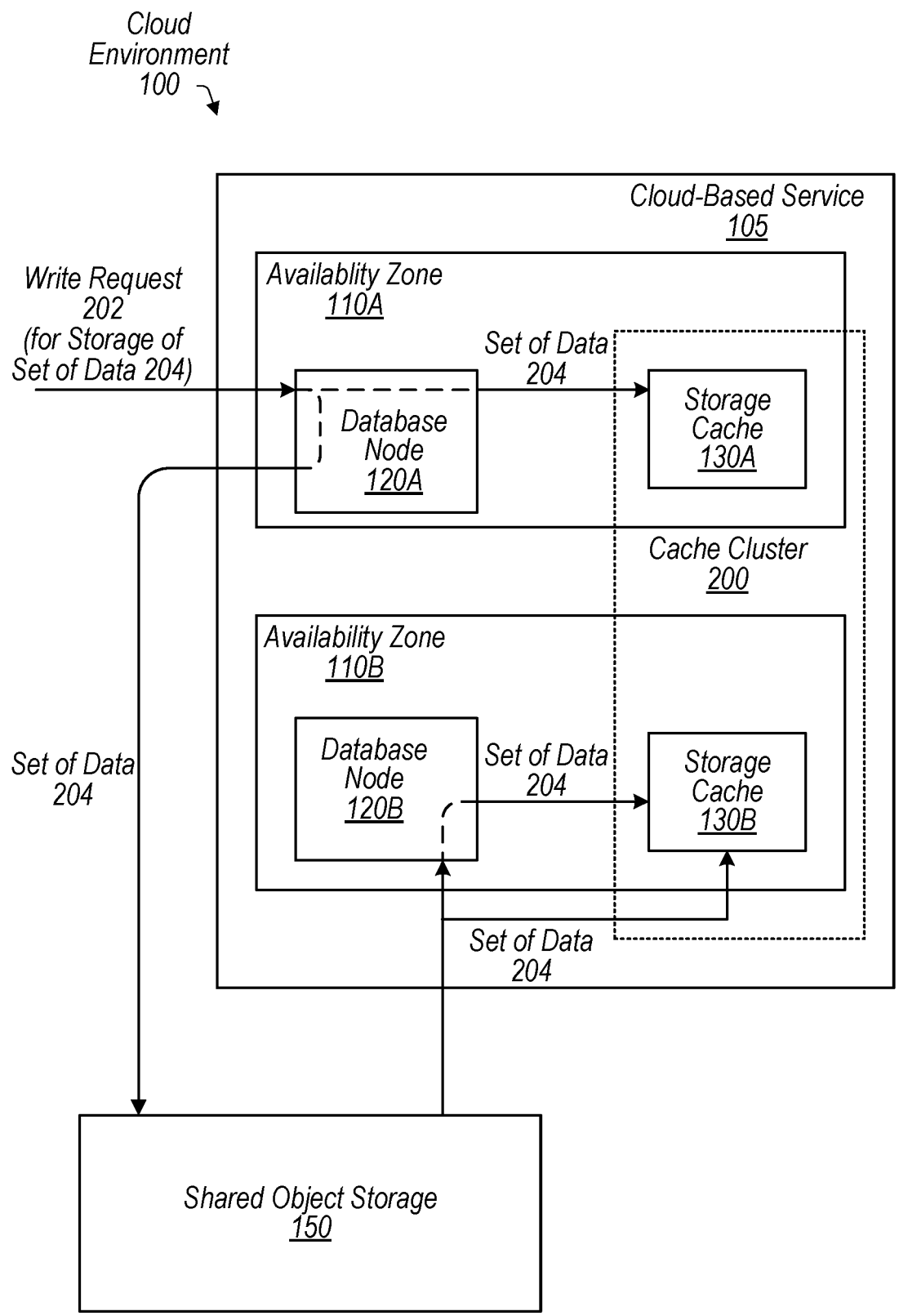
FIG. 2 is a block diagram illustrating example elements of a cloud environment including a cloud-based service configured to handle write requests to the cloud-based service, according to some embodiments.

Turning now to FIG. 2, a block diagram is shown illustrating example elements of a cloud environment including a cloud-based service configured to handle write requests to the cloud-based service. In certain embodiments, storage cache 130A and storage cache 130B are part of cache cluster 200. As used herein, the term "cache cluster" refers to an organization of storage caches 130 distributed across multiple availability zones 110 for replication and availability of data across the availability zones. In various embodiments, cloud-based service 105 receives a write request 202 for a set of data 204. The request may come from an entity such as a user, a tenant, an organization, business, etc. at a local database node in cloud-based service 105.

In the illustrated embodiment, database node 120A is the local database node that receives the write request 202 for set of data 204. Database node 120A determines where to store set of data 204 in cloud environment 100. For example, database node 120A may determine where to store set of data 204 based on metadata associated with write request 202 (such as metadata for the entity that submitted the request). In certain embodiments, database node 120A determines to store set of data 204 in shared object storage 150. In some embodiments, database node 120A also determines to store set of data 204 in storage cache 130A for local storage in availability zone 110A. As described above, database node 120A may store set of data 204 in shared object storage 150 as a main storage location for the set of data while storage cache 130A is used to locally store the set of data. It should be noted that database node 120A may determine to store set of data 204 with storage proceeding in one storage element before the other storage element or with storage proceeding in both storage elements in parallel. For example, database node 120A may perform storage in storage cache 130A before shared object storage 150 due to the low latency of transmission to storage cache 130A.

With set of data 204 stored in both storage cache 130A and shared object storage 150, as shown in FIG. 2, the set of data is stored in a low latency storage element (storage cache 130A) for fast retrieval of the data and the set of data is stored in a persistent storage element (shared object storage 150) for cost-effective, durable, and scalable storage of the data. Database node 120A may transmit metadata for the storage of set of data 204 in both storage cache 130A and shared object storage 150 to cluster manager 160, as described herein.

In certain embodiments, database node 120B, which is in a different availability zone 110B from database node 120A in availability zone 110A, determines to retrieve set of data 204 from shared object storage 150. Database node 120B may determine to retrieve set of data 204 for various reasons. In some embodiments, database node 120B determines to retrieve set of data 204 from shared object storage 150 in response to database node 120B receiving a request to retrieve the set of data, as described in the embodiment of FIG. 3 below. In various embodiments, database node 120B determines to retrieve set of data 204 from shared object storage 150 based on an indication that new or updated data (e.g., the data has an update) has been received in cloud-based service 105. For example, metadata received by database node 120B from cluster manager 160 may include an indication that new or updated data has been received by database node 120A (and subsequently stored in shared object storage 150). In other embodiments, database node 120B may determine to retrieve set of data 204 from shared object storage 150 when database node 120B determines that data in storage cache 130B has suffered a data failure (e.g., the data is lost, has an error, or is invalid), which may be determined based on metadata received from cluster manager 160.

In certain embodiments, as shown in FIG. 2, storage cache 130B (and any other storage cache described herein) retrieves data directly from shared object storage 150 for local storage in availability zone 110B. For instance, storage cache 130B may receive an indication received from its collocated database node 120B or a database node 120 in another availability zone to retrieve set of data 204. In various embodiments, the retrieval of set of data 204 is executed by cache node 180 (shown in FIG. 1B) where the cache node includes a set of software routines executable to implement retrieval of data directly from shared object storage 150. Retrieving set of data 204 directly from shared object storage 150 allows storage cache 130B to retrieve the set of data without the set of data going through database node 120B or another database node. In some embodiments, cache node 180 itself may be responsible for determining to retrieve data from shared object storage 150 and executing the retrieval. In some embodiments, cache node 180 may also be capable of transmitting (writing) data to shared object storage 150 without the data going through database node 120B (or another database node). In some contemplated embodiments, database node 120B first retrieves set of data 204 from shared object storage 150 and then transmits the retrieved set of data to storage cache 130B for local storage in availability zone 110B.

Data retrieval from shared object storage 150 is typically less expensive than data transmission across availability zones. For example, data retrieval from shared object storage 150 may be determined on a per transaction basis while data transmission across availability zones is determined based on the amount of data in the transmission. Thus, retrieving set of data 204 from shared object storage 150 for storage in availability zone 110B rather than retrieving the set of data from storage cache 130A or database node 120A may reduce the cost to populate storage cache 130B with the set of data.

With the local storage of set of data 204 in storage cache 130B, the set of data is now replicated across availability zones 110A and 110B and is available for local retrieval in either availability zone. Local storage in availability zones 110A and 110B allows data to be retrieved directly from local storage (e.g., a local storage cache) by a database node in either availability zone in response to a data retrieval request. For instance, database node 120A may retrieve the requested data from storage cache 130A if the source of the request is local to availability zone 110A or database node 120B may retrieve the requested data from storage cache 130B if the source of the request is local to availability zone 110B. Thus, local storage in availability zones 110A and 110B provides low latency data retrieval for cloud-based service 105 while storage in shared object storage 150 provides durable main storage for data.

Figure 3:
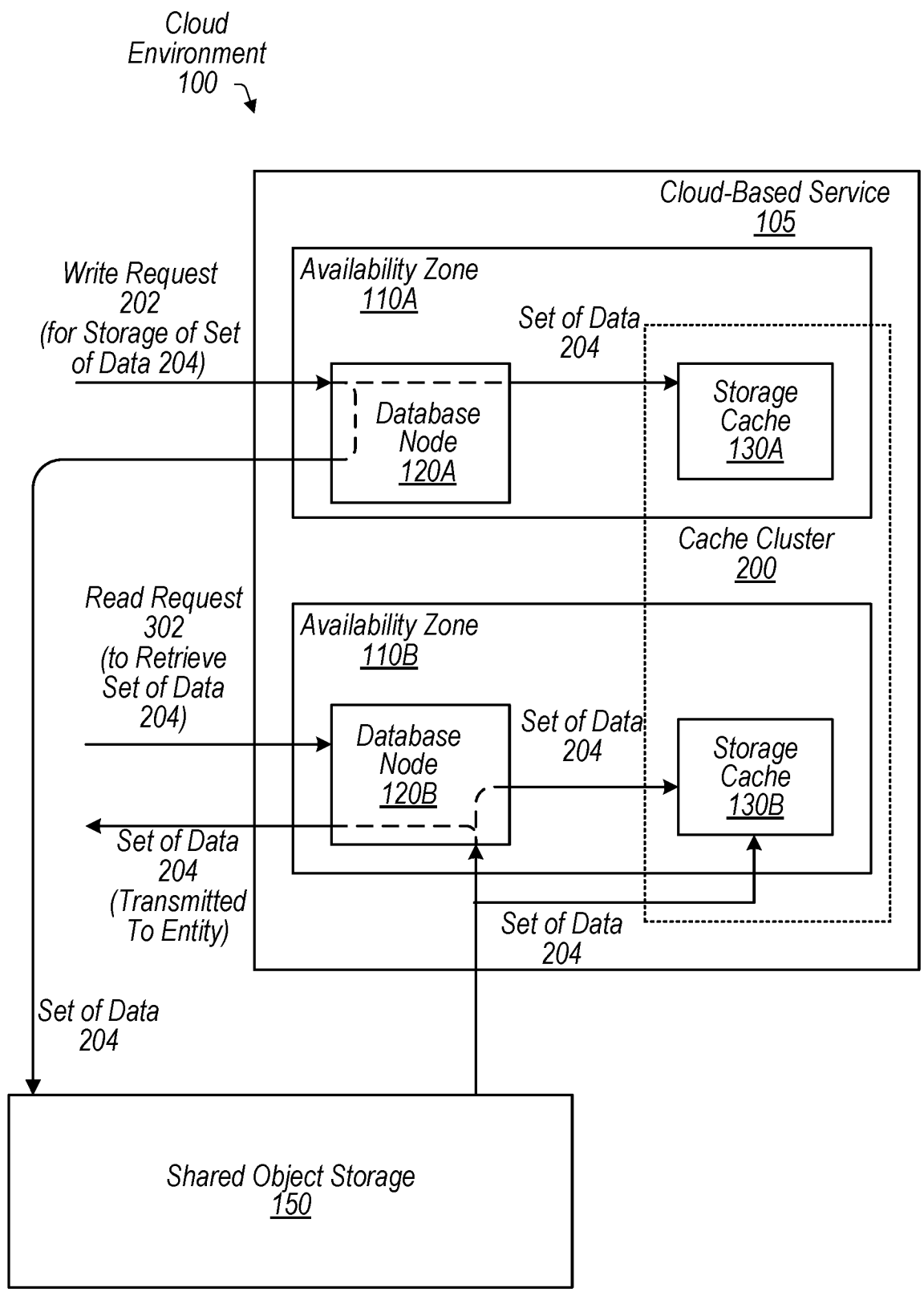
FIG. 3 depicts a block diagram illustrating example elements of a cloud environment including a cloud-based service configured to handle write and read requests to the cloud-based service, according to some embodiments.

FIG. 3 depicts a block diagram illustrating example elements of a cloud environment including a cloud-based service configured to handle write and read requests to the cloud-based service. In the illustrated embodiment, database node 120B receives read request 302 to retrieve set of data 204. Read request 302 may be received from an entity, as described herein. In various embodiments, read request 302 is received from an entity local to availability zone 110B (e.g., availability zone 110B is the local availability zone for the entity making the read request). In response to receiving read request 302, database node 120B determines whether the requested data is available in storage cache 130B. For instance, upon receiving read request 302, database node 120B may retrieve metadata for set of data 204 from cluster manager 160. Database node 120B may then determine where to retrieve the data from to satisfy read request 302. If the data is determined to be available in storage cache 130B, then database node 120B may retrieve the data from storage cache 130B (not shown) and transmit the set of data to the entity making read request 302.

In various embodiments, database node 120B determines that the requested data is not available in storage cache 130B and database node 120B retrieves the data from shared object storage 150. In some embodiments, database node 120B determines that the data in storage cache 130B is older and database node 120B retrieves the data from shared object storage 150. For example, the version of the data in storage cache 130A and shared object storage 150 is updated compared to the version of the data in storage cache 130B. In some embodiments, database node 120B determines that the data in storage cache 130B is invalid or has an error and database node 120B retrieves the data from shared object storage 150. The set of data 204 retrieved by database node 120B is then transmitted to the entity making read request 302 and to storage cache 130B for local storage of the set of data in availability zone 110B (e.g., population of availability zone 110B with the set of data). In these embodiments, database node 120B retrieves set of data 204 from shared object storage 150 rather than storage cache 130A to reduce the cost of retrieving the data, as described above.

As described herein, embodiments of cloud-based service 105 may include more than two availability zones 110. In such embodiments, additional availability zones 110 may be populated similarly to the embodiment described above for populating availability zone 110B. FIG. 4 depicts a block diagram illustrating example elements of a cloud environment including a cloud-based service with three availability zones 110 configured to handle write and read requests to the cloud-based service. In the illustrated embodiment, storage cache 130A and storage cache 130B have been populated with set of data 204, as described in the embodiments above. In various embodiments, database node 120C receives read request 402 to retrieve set of data 204. Read request 402 may be received from an entity, as described herein.

In response to receiving read request 402, database node 120C determines the storage element to retrieve the requested data from. For example, database node 120C determines whether to retrieve the requested data from storage cache 130C or shared object storage 150. Database node 120C may make the determination where to retrieve the requested data from in a similar manner to the determination made by database node 120B for the embodiment of FIG. 4, described above. The set of data 204 retrieved by database node 120C is then transmitted to the entity making read request 402. When database node 120C retrieves set of data 204 from shared object storage 150, database node 120C also transmits set of data 204 to storage cache 130C for local storage of the set of data in availability zone 110C (e.g., population of availability zone 110C with the set of data).

Figure 5:
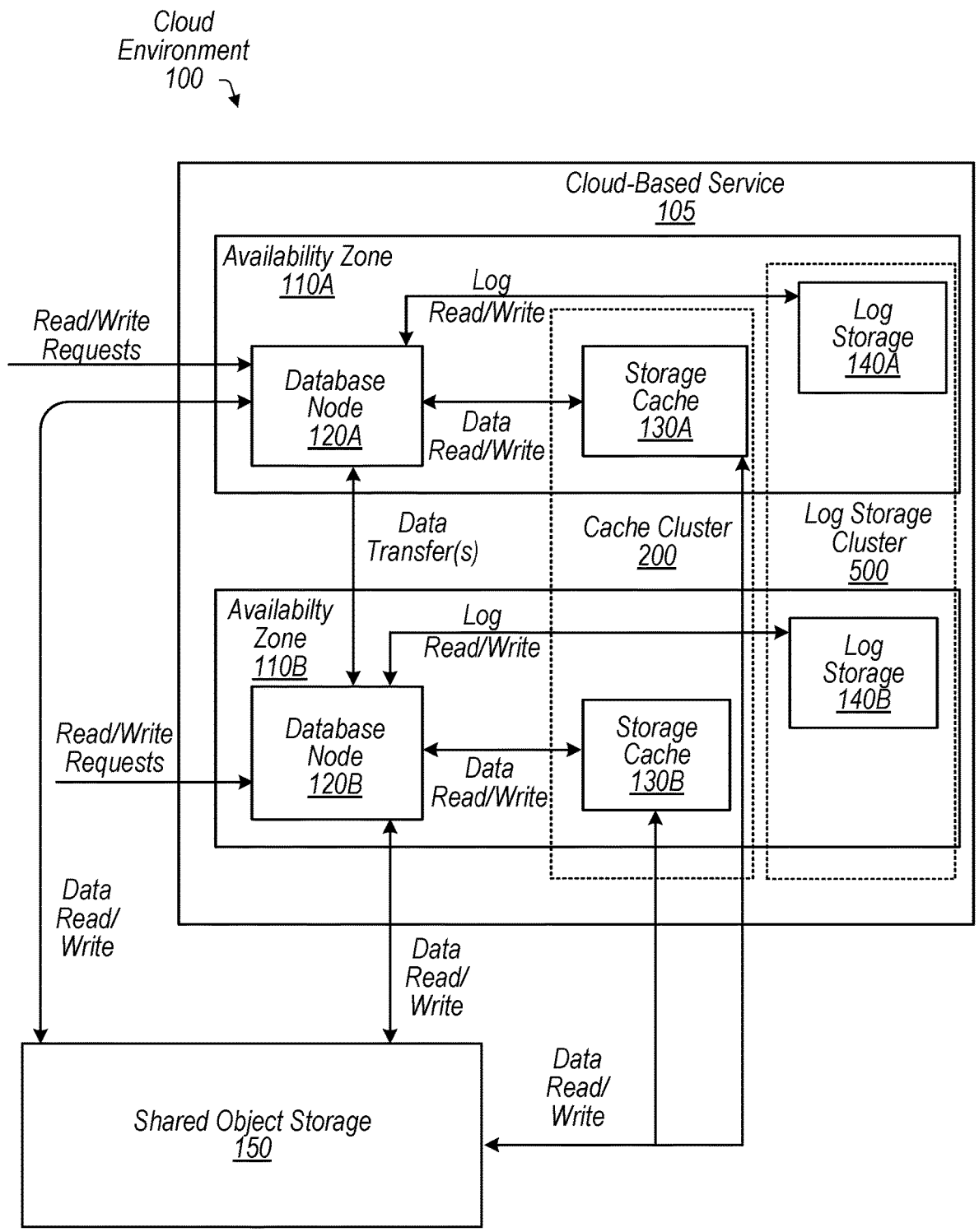
FIG. 5 depicts a block diagram illustrating example elements of a cloud environment including a cloud-based service configured to handle write and read requests to the cloud-based service along with writes and reads for a log of the write and read requests, according to some embodiments.

FIG. 5 depicts a block diagram illustrating example elements of a cloud environment including a cloud-based service configured to handle write and read requests to the cloud-based service along with writes and reads for a log of the write and read requests. In the illustrated embodiment, cloud-based service 105 includes log storages 140 in availability zones 110 in addition to database nodes 120 and storage caches 130 (as also shown in FIG. 1A). Log storage 140A is collocated with database node 120A and storage cache 130A in availability zone 110A. Log storage 140B is collocated with database node 120B and storage cache 130B in availability zone 110B. In certain embodiments, log storage 140A and log storage 140B are part of log storage cluster 500. As used herein, the term "log storage cluster" refers to an organization of log storages 140 distributed across multiple availability zones 110 for replication and availability of log data across the availability zones.

In various embodiments, as described herein, database node 120A and database node 120B handle transactions in cloud environment 100. Examples of transactions include, as shown in FIG. 5, "read/write requests" and "data read/write" to storage cache 130A, storage cache 130B, or shared object storage 150. In some embodiments, database node 120A and database node 120B may also handle data transfer(s) transactions between the database nodes, if needed (e.g., if data is not available in shared object storage 150). Database node 120A or database node 120B may generate a log of a transaction as the transaction occurs and store (e.g., write) the log of the transaction in the corresponding log storage (e.g., either log storage 140A or log storage 140B, respectively). Thus, log storages 140A and 140B are used to store the logs of transactions occurring over time by their respective database nodes 120A and 120B.

In certain embodiments, a log of a transaction includes a time record of the transaction and a copy of the data for the transaction. As an example, database node 120A may generate a log of a transaction to write data to storage cache 130A in response to a write request. As such, the log of the transaction stored in log storage 140A by database node 120A includes a copy of the data written to storage cache 130A along with the time record of the transaction. In various embodiments, the logs of transactions stored in log storage 140A and log storage 140B are used to facilitate recovery of data in the event of a problem in cloud environment 100. For example, in the event of a failure of a transaction involving writing data to storage cache 130A, one or more writes of data to the storage cache may need to be rolled back. The logs of transactions stored in the log storage 140A may be read by database node 120A and used to determine what writes were performed and what writes need to be rolled back or undone.

In some embodiments, transaction logs stored in a log storage in one availability zone (e.g., log storage 140A in availability zone 110A) are replicated into log storages in other availability zones (e.g., log storage 140B in availability zone 110B). In one contemplated embodiment, transaction logs may be replicated similar to the replication of a set of data (e.g., set of data 204, described above). For example, a transaction log for a transaction handled by database node 120A may be stored in shared object storage 150 along with the set of data (in addition to the transaction log being stored in log storage 140A). The transaction log may then be retrieved from shared object storage 150 by database node 120B along with the set of data in response to, for example, a read request. Database node 120B may then store the transaction log in log storage 140B in addition to storing the set of data in storage cache 130B. Retrieving the transaction log along with the set of data from shared object storage 150 may be more cost effective in instances where the cost for retrieving data from the shared object storage is on a per transaction basis. In another contemplated embodiment, the database node generating the transaction log (e.g., database node 120A) may directly transmit the transaction log to each log storage in each availability zone (as the cost for transmitting and storing the transaction log in a log storage may be reasonable).

Figure 6:
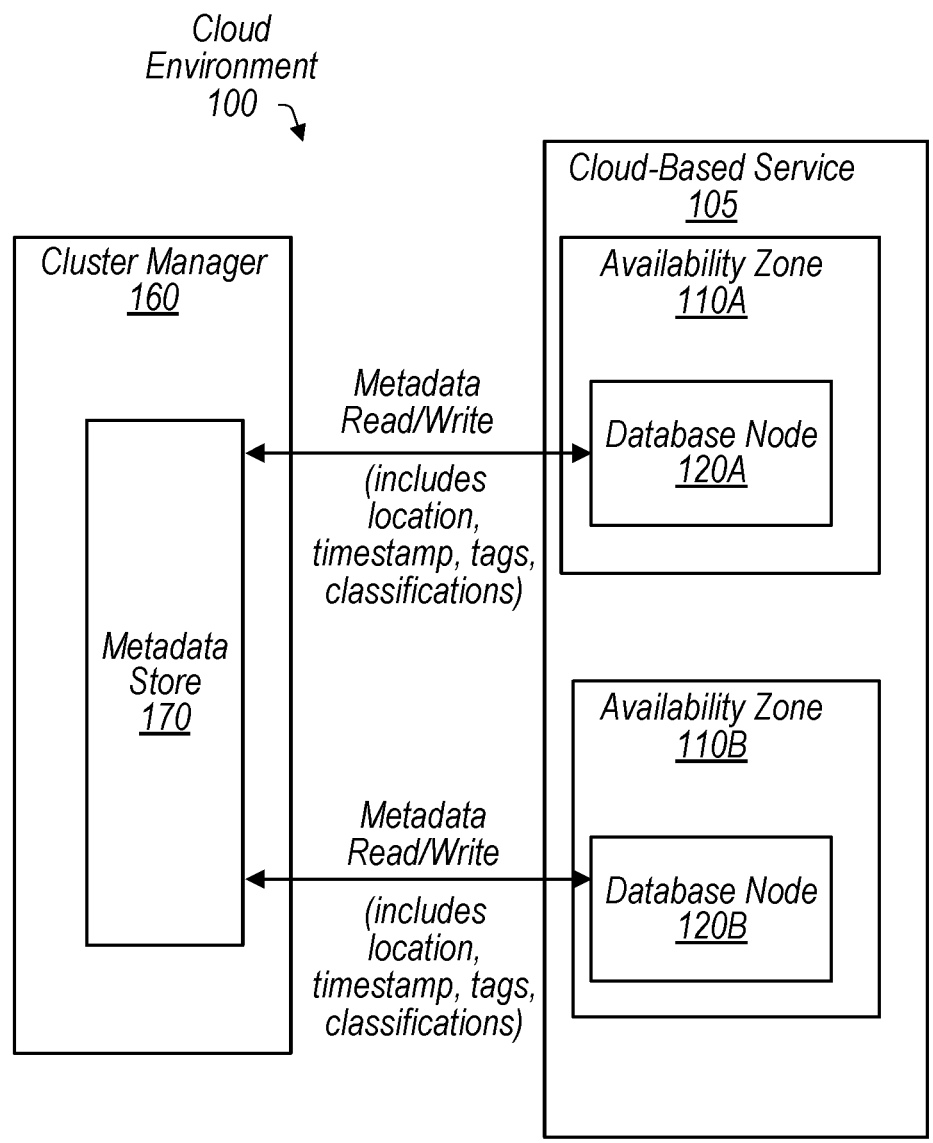
FIG. 6 depicts a block diagram illustrating example elements of a cloud environment including a cloud-based service and a cluster manager, according to some embodiments.

In various embodiments, as described herein, metadata may be used by various nodes (e.g., database nodes 120 or cache nodes 180 associated with storage caches 130) to determine how to handle requests and transactions for data in cloud environment 100. FIG. 6 depicts a block diagram illustrating example elements of a cloud environment including a cloud-based service and a cluster manager. As shown in FIG. 6, in certain embodiments, metadata is stored in metadata store 170, which is instantiated by cluster manager 160. Examples of information available in metadata includes the locations where particular data has been stored in cloud-based service 105 or where particular is being stored in cloud-based service 105. Other examples of information available in metadata include timestamps, tags, or classifications for the data stored or being stored in cloud-based service 105.

In certain embodiments, database nodes 120 in cloud-based service 105 have access to metadata store 170. For example, as shown in FIG. 6, database nodes 120 may implement read/write of metadata from/to metadata store 170. In various embodiments, database nodes 120 access metadata to determine where to store data or to determine where data is stored based on the metadata. For instance, in the event of a write request received by database node 120A, the database node may access metadata to determine where to send the data in the write request for storage. In some embodiments, metadata in metadata store 170 may be directly accessed by storage caches 130 in cloud-based service 105. Additional embodiments for usage of metadata by database nodes 120 and storage caches 130 are described herein.

Figure 7:
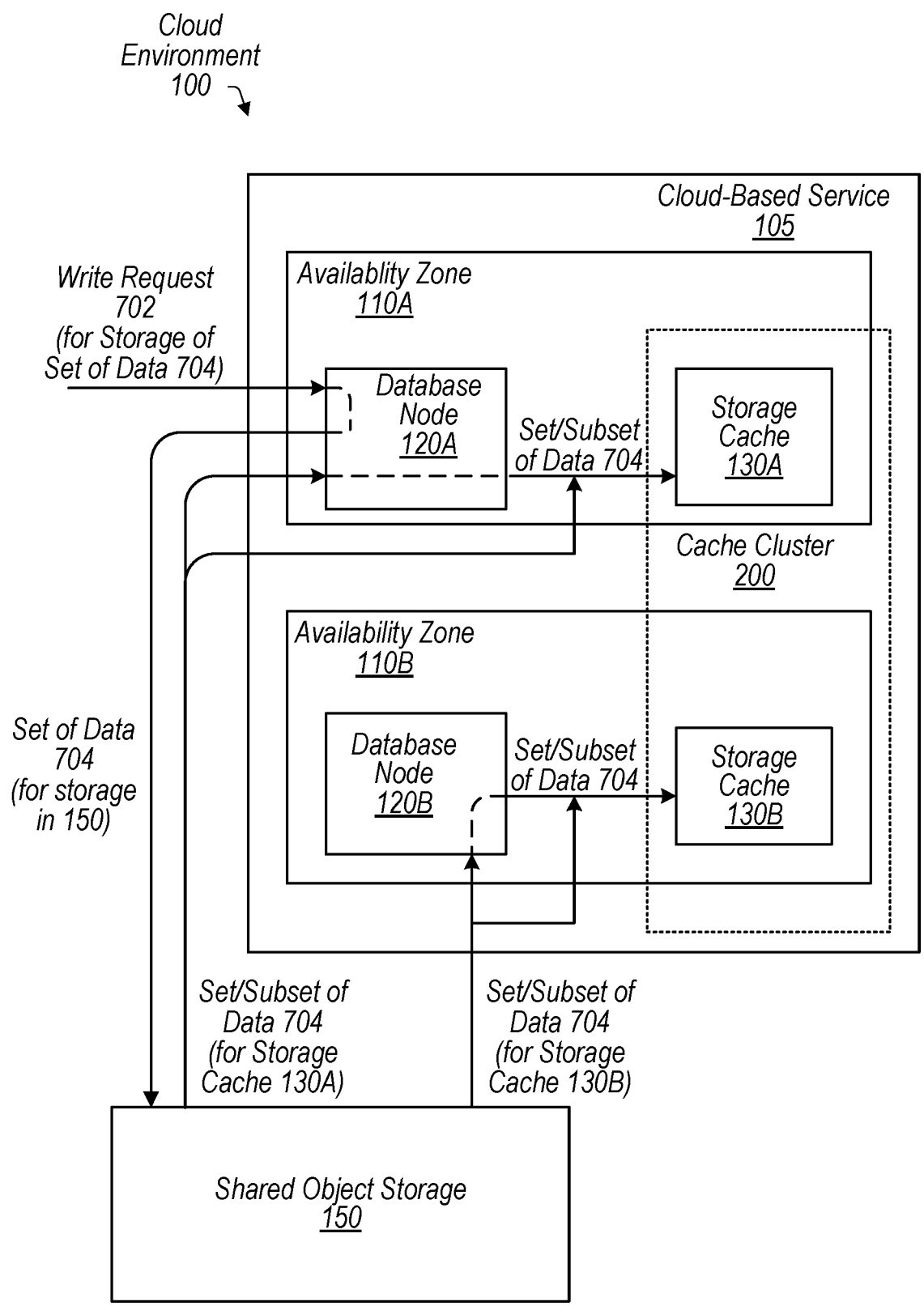
FIG. 7 depicts a block diagram illustrating example elements of a cloud environment including a cloud-based service configured to direct storage of write requests to a shared object storage for later population of local storage in the cloud-based service, according to some embodiments.

Various embodiments may be contemplated where a database node 120 initially stores a set of data in shared object storage 150 before populating the local storage (e.g., storage cache 130) for the database node. FIG. 7 depicts a block diagram illustrating example elements of a cloud environment including a cloud-based service configured to direct storage of write requests to a shared object storage for later population of local storage in the cloud-based service. The illustrated embodiment may be implemented, for instance, in situations where the set of data in a write request is a large set of data. In such situations, it may be more economical for the database node to store the data directly in shared object storage 150 rather than the local storage cache to take advantage of the high bandwidth capacity and low per transaction cost of the shared object storage. Additionally, storage of the large set of data may be difficult depending on a size of the local storage cache 130. After storage of the data in shared object storage 150, local storage (e.g., storage caches 130) in availability zones 110 may be populated as needed from shared object storage 150. In some instances, the data populated in the local storage caches 130 may be a subset of the data stored in shared object storage 150 (e.g., in instances where the set of data stored in shared object storage 150 is too large for the local storage caches).

In the illustrated embodiment of FIG. 7, database node 120A receives write request 702 for the storage of set of data 704. In certain embodiments, database node 120A determines that set of data 704 is to be stored in shared object storage 150 before being stored locally in storage cache 130A. For example, set of data 704 may be too large for storage cache 130A or the set of data may be sufficiently large where the high bandwidth storage to shared object storage 150 first is preferred for economic or other reasons. Database node 120A then sends set of data 704 for storage in shared object storage 150.

In some embodiments, after set of data 704 is stored in shared object storage 150, database node 120A or database node 120B may retrieve and store the set of data in storage cache 130A or storage cache 130B, respectively. In other contemplated embodiments, storage cache 130A or storage cache 130B may directly retrieve set of data 704 from shared object storage 150. For example, cache node 180 (shown in FIG. 1B) implemented in storage cache 130 may directly retrieve data from shared object storage 150 for storage in the storage cache. In some embodiments, cache node 180 may directly retrieve the data in response to an indication from its collocated database node 120 or a database node 120 in another availability zone. It should be noted that various embodiments described herein may also include the direct retrieval of data from shared object storage 150 by storage caches 130 (through cache node 180).

In some embodiments, the database nodes 120 (or storage caches 130) retrieve set of data 704, or a subset of the set of data, in response to the storage of the set of data in shared object storage 150. For example, the database nodes 120 may receive an indication (based on metadata) that new or updated data has been stored in shared object storage 150, and, in response to the indication, retrieve set of data 704 or a subset of the set of data. In some embodiments, as described above, a database node 120 (or a storage cache 130) retrieves set of data 704, or a subset of the set of data, in response to a read request received by the database node. In some embodiments, a database node 120 (or a storage cache 130) retrieves set of data 704, or a subset of the set of data, in response to a determination that data in the storage cache is invalid, missing, or has an error (e.g., a data failure).

Class-based Cache Management

The present disclosure describes various techniques for managing a plurality of storage caches in a distributed storage system according to classifications for various entities utilizing the distributed storage system. Traditionally, cache management is performed by the application layer of a distribution storage system by allowing cache data to fall off and become rehydrated using either explicit or implicit cache population on a cache miss, for example. Different datasets, however, may not be of the same importance. That is, data cached for a first entity may be more valuable than data cached for a second, different entity. For example, data that is accessed often and quickly after initial storage may be referred to as "hot" data. As such, data stored for some entities (e.g., hot data) may require a higher availability than data stored for others. In addition, the retrieval of high-valued data may require lower latency than low-valued data.

Specifically, the present disclosure provides for variable availability of caches implemented in the different availability zones of a data cluster used by a distributed storage system to store data. As discussed above with reference to FIG. 1A, caches are located in different availability zones which are coupled to database nodes included in the data cluster of the distributed storage system. Database nodes included in the data cluster handle retrieval, manipulation, and storage of data in both the cache cluster and the shared object storage for their corresponding availability zones. During normal operation of data storage, a database node writes data into both the cache cluster (for low-latency retrieval) and the shared object storage (which provides high bandwidth) such that the data is replicated between the two storage elements with the cache cluster providing temporary (e.g., ephemeral) storage and the shared object storage providing persistent storage. During normal data retrieval operations, data is read from the cache cluster (e.g., from a given cache located in an availability zone) for low latency data retrieval—assuming that the data was previously stored in the cache.

As caches store data temporarily, data stored in a given cache can be lost in the event of a failure or power loss to the given cache. Following data loss in a cache, the database node coupled to the cache associated with the lost data may retrieve the lost data directly from the shared object storage to repopulate the given cache. Retrieving data directly from the shared object storage is more cost-effective than retrieving data across availability zones in the event of data loss. As such, the disclosed cache management techniques may advantageously decrease costs associated with data management, e.g., in the event of a system failure. In addition, the disclosed cache management technique may advantageously increase the availability of space for high-priority data, thereby improving response times for a database provided via a cloud-based service.

In some situations, use of caches for low latency data retrieval can be expensive, or limited in availability, or both. As such, the present disclosure discusses techniques for varying the availability of caches for storage of various data based on classes associated with data to be stored. In this way, data is prioritized based on class to more efficiently utilized limited cache storage. This ensures, for example, that plenty of space is available for hot data. A class assigned to a dataset to be stored in the cache cluster is dictated by either the entity (e.g., user, tenant, organization, company, etc.) associated with that dataset or the type of data included in the dataset, or both. In some embodiments, a system administrator assigns classifications to different entities.

Different classes of entities indicate how data for these entities is tagged and ultimately stored in caches. The distributed storage system may determine a number of availability zones in which to store a set of data based on, for example, the user ID of a user associated with the set of data. As one particular example, a "gold" customer might have copies of their data stored across three different availability zones, while a "bronze" customer might have only one copy of their data stored in a single, local availability zone. A customer might be classified as "gold" if they pay at least a threshold amount for database services provided by the distributed storage system. That is, gold customers pay more for services than bronze customers, for example. In this particular example, in the case of a cache failure at their local availability zone (e.g., due to a power outage at the availability zone where the bronze customer stores their data), the bronze customer must wait for the system to fetch their requested data from shared object storage (which is associated with a higher latency than retrieval of data from the cache). In contrast, in the event of a system failure at their local availability zone, data for the gold customer is retrievable from another, externally located availability zone for responding to queries from the gold customer. During the response to the gold customer using data from another availability zone, the system also repopulates data in the failed cache for the gold customer by pulling data from the shared object storage.

Retrieving data from a "local" availability zone includes a database node retrieving data from a cache that is located in the same availability zone as the database node. That is, a cache is local to a given database node if it is collocated with the given database node in the same geographic cloud region. In some embodiments, the computer system utilized by an entity to request data from the distributed storage system is collocated with the database node utilized to retrieve the requested data. In contrast, data retrieval from an "external" availability zone includes a database node retrieving data from a cache that is located in a different availability zone than the database node. For example, the database node might retrieve requested data from a cache that is not located in the same geographic region as the database node.

Figure 8:
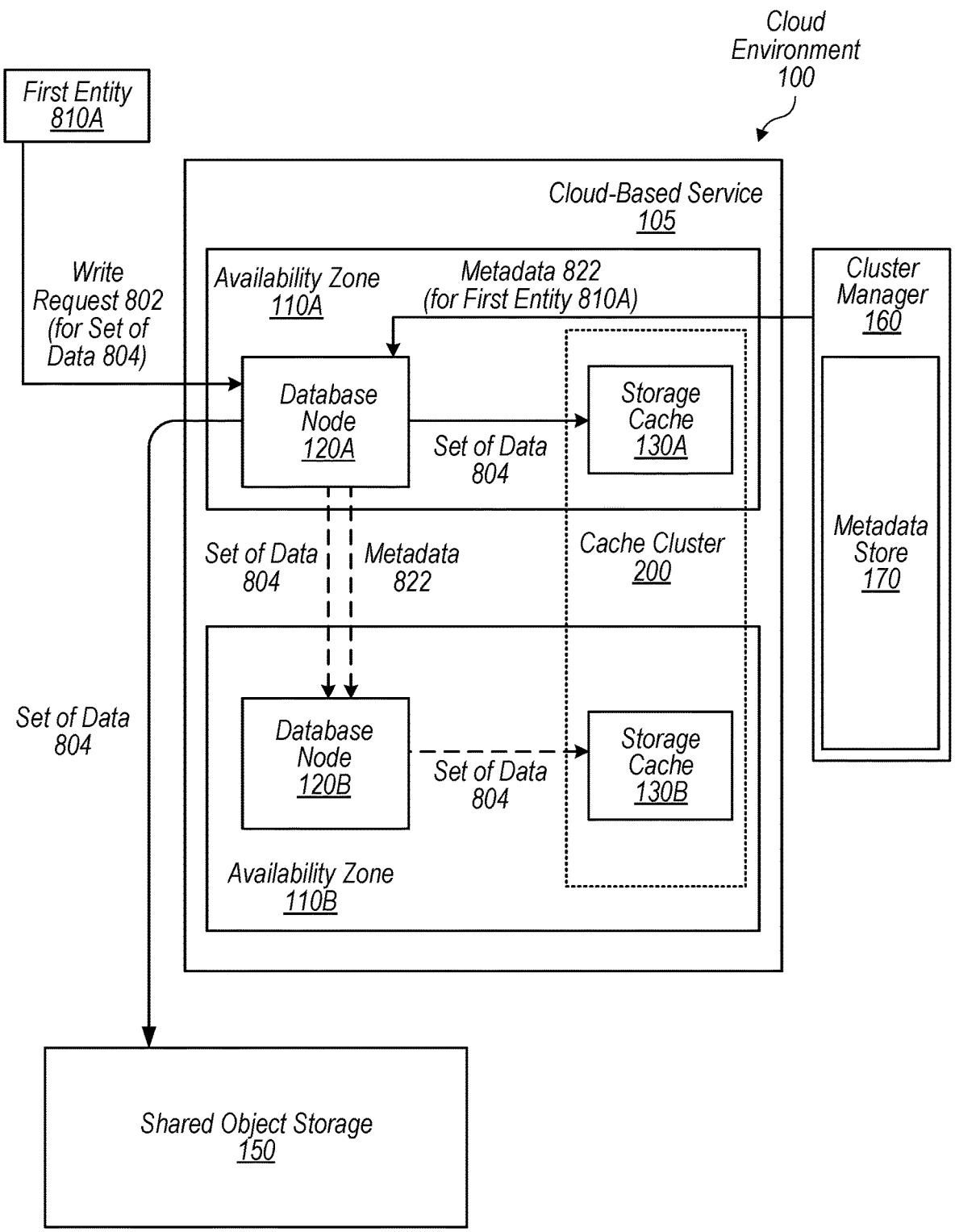
FIG. 8 is a block diagram illustrating example elements of a cloud environment including a cloud-based service configured to handle write and read requests from various entities based on metadata associated with the various entities, according to some embodiments.

Turning now to FIG. 8, a block diagram is shown illustrating example elements of a cloud environment including a cloud-based service 105 configured to handle write requests from various entities based on metadata 822 associated with the various entities. In the illustrated embodiment, cloud-based service 105 receives a write request 802 for a set of data 804 from a first entity 810A at a local database node 120A.

Database node 120A, in the illustrated embodiment, is co-located with the first entity 810A (e.g., the computing device utilized by this entity). For example, database node 120A and first entity 810A are located within the same geographical region. For example, database node 120A is located in availability zone 110A which is located in a similar geographic location as first entity 810A. In order to satisfy request 802, database node 120A communicates with cluster manager 160 to obtain metadata 822 for the first entity 810A. First entity 810A may be a user, customer, tenant, organization, business, etc. In various embodiments, first entity 810A may be associated with an identifier. For example, database node 120A may provide an identifier (ID) of first entity 810A to cluster manager 160.

Cluster manager 160 locates metadata 822 for the first entity within metadata store 170 and provides this metadata for first entity 810A to database node 120A. The metadata 822 includes a classification for the first entity 810A. This classification is usable by various database nodes to determine how to store data for the first entity 810A, for example. If first entity 810A is a "gold" customer, for example, this customers data may have priority over a "silver" customer, for example. In some embodiments, the metadata includes tags maintained by the cluster manager for different sets of data based on classifications for the entities associated with the different sets of data. The tag for set of data 804, for example, may indicate an availability zone of one or more caches storing copies of the set of data 804.

After obtaining metadata 822 for first entity 810A, database node 120A determines where to store the set of data 804. Database node 120A first stores the set of data 804 locally in storage cache 130A and then stores set of data 804 in shared object storage 150. Note that database node 120A may store data in the storage cache 130A prior to storing data in the shared object storage 150 due to the lower latency associated with storage 150. In other situations, database node 120A may perform storage in the two different storage elements in parallel. In various embodiments, manipulation of data by databased nodes 120 is affected by classifications of different entities. For example, storage of a set of data might entail determining a cache allocation size based on a class of an entity and determining whether to evict data to comply with a determine size limit. Manipulation of data based on entity classifications is discussed in further detail below with reference to FIGS. 10A and 10B.

In some embodiments, database node 120A transmits set of data 804 and metadata 822 to database node 120B. Note that database node 120B is located in a different availability zone 110B than database node 120A. Database node 120B stores a copy of set of data 804 in storage cache 130B. Database node 120B may then determine, based on the metadata 822 for first entity 810A, whether to transmit set of data 804 to a third database node 120C for storage in a third storage cache 130C. In other embodiments, database node 120B receives metadata 822 from database node 120A and determines whether to pull data from storage cache 130A for storage in storage cache 130B based on the metadata 822. For example, rather than receiving instructions from database node 120A to store a copy of set of data 804, database node 120B makes its own storage determination based on metadata 822. In some embodiments, database node 120B determines how to store a copy of the set of data 804 in storage cache 130B based on the metadata. For example, database node 120B may instruct storage cache 130B to maintain the set of data 804 in storage for ten minutes, while data for another entity may be retained for an hour. Storage of data based on information included in the metadata for various entities is discussed in further detail below with reference to FIG. 9.

As discussed above with reference to FIG. 1A, cluster manager 160 maintains information for various elements of cloud-based service 105, such as the health of database nodes 120 (e.g., which nodes have crashed), as well as metadata used by the various nodes to determine how to handle requests from various entities for data. That is, cluster manager 160 is operable to maintain information for cache cluster 200. As such, cloud-based service 105 is zone-aware. For example, service 105 is able to identify the location (availability zone 110) of cached data. In various embodiments, after caching data in their respective storage caches 130, database nodes 120 are configured to provide the location of the data to cluster manager 160 for storage in the metadata store 170. This may allow cloud-based service 105 to identify which availability zone to begin retrieving data from when a read request is received, for example. In this way, service 105 is aware of the most recent availability zone it accessed as well as a zone in which requested data is located.

In some embodiments, database node 120A receives a read request from one or more entities. For example, first entity 810A may request a different set of data than the set of data 804 specified in write request 802. Database node 120A is configured to identify a storage location (e.g., shared object storage 150, or one of storage caches 130A) from which to retrieve the requested data based on metadata 822 for first entity 810A. In various embodiments, read requests are affected by classifications for different entities. For example, if database node 120A incurs a cache miss, this node must determine whether to retrieve data from slower shared object storage or whether to incur additional expenses by pulling requested data from faster storage e.g., a storage cache located in another availability zone. Such class-based decisions are discussed in further detail below with reference to FIGS. 10A and 10B.

Figure 9:
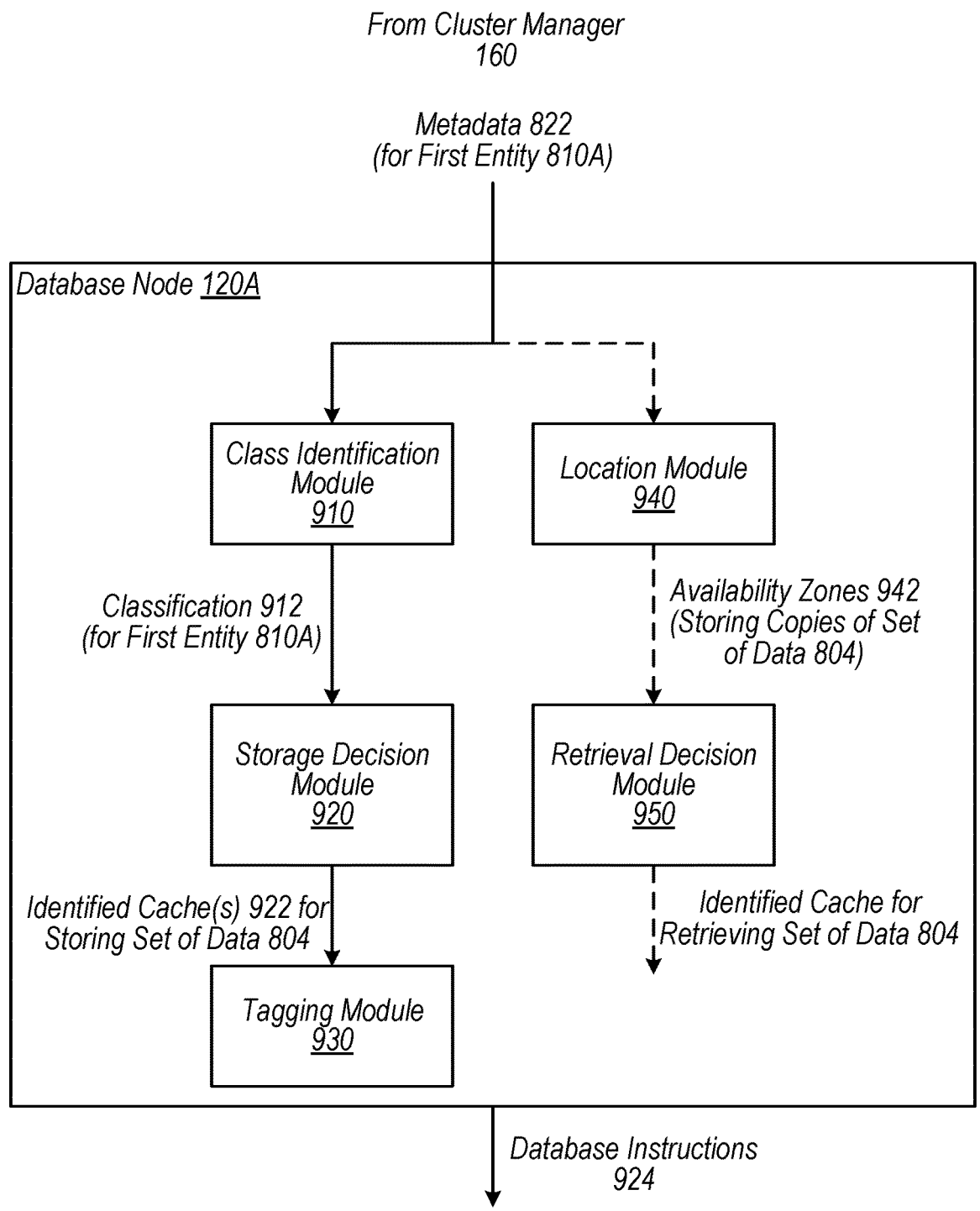
FIG. 9 is a block diagram illustrating an example database node configured to identify caches for storing data for a first entity, according to some embodiments.

FIG. 9 is a block diagram illustrating an example database node configured to identify caches for storing data for a first entity. In the illustrated embodiment, database node 120A includes class identification module 910, storage decision module 920, tagging module 930, location module 940, and retrieval decision module 950.

Database node 120A, in the illustrated embodiment, receives metadata 822 for first entity 810A from cluster manager 160 and provides the metadata to class identification module 910. In the illustrated embodiment, class identification module 910 identifies a classification 912 for first entity 810A and sends this classification to storage decision module 930. For example, class identification module 910 may use an ID of the first entity 810A to look up this entity's class in a table maintained by cluster manager 160. As another example, this entity's classification may be included in an ID of the first entity 810A such as a tenant ID. In this particular example, module 910 extracts the classification from the tenant ID. In various embodiments, class identification module 910 may determine that the first entity 810A is a new customer (e.g., has been utilizing cloud-based service 105 for only two weeks). Based on this determination, module 910 might classify first entity 810A as a "low-priority" customer.

Storage decision module 920 determines, based on classification 912, where to store data received from the first entity 810A in a write request (e.g., set of data 804 in write request 820). For example, storage decision module 930 may determine to store data for the high-priority entity in both a local cache (e.g., located in the same availability zone as database node 120A) as well as several caches located across different availability zones. Such multi-zone storage of data may advantageously reduce or prevent a high-priority entity from experiencing cache misses (e.g., for important data). For example, large tenants (e.g., a company spread across the United States or the globe) are likely to access a database from multiple availability zones simultaneously. In this example, if data is needed at one database node, it is likely that the same data will also be request by other database nodes in other availability zones for a large entity. As such, the disclosed system is configured to preload data into various caches across availability zones for large entities in anticipation that the data will be requested across various zones, thereby avoiding cache misses.

In some embodiments, storage decision module 920 might determine not to cache data for a given entity at all. For example, storage decision module 920 might determine that data for a second entity (e.g., a low-priority entity) should be stored only in the shared object storage (e.g., storage 150). Storage decision module 920 then outputs one or more identified caches 922 (e.g., caches 130) e.g., for storing the set of data 804 received from first entity 810A.

Tagging module 930, in the illustrated embodiment, assigns a tag to set of data 804 based on the identified caches 922. This tag may be used by database node 120A or other database nodes 120, or both to determine where additional copies of set of data 804 should be stored. For example, if database node 120A transmits tagged set of data 804 to database node 120B, node 120B might store the set of data in storage cache 130B and then determine, based on the tag, whether to transmit the set of data 804 to a third database node 120C for storage in a third storage cache 130C. In this example, database node 120B determines to store and transmit set of data 804 based on the tag assigned by tagging module 930.

In some embodiments, database node 120A also provides metadata 822 to location module 940. For example, database node 120A may provide the metadata to module 940 when attempting to read data. As indicated by the dotted lines in the illustrated embodiment, location module 940 may determine one or more availability zones 942 currently storing copies of the set of data 804 based on a tag assigned to the set of data 804. For example, metadata 822 may include various tags indicating different availability zones with various different caches. As discussed herein, database node 120A may assign tags to different sets of data prior to storing this data in caches according to tags maintained by cluster manager 160. Said another way, a tag assigned to set of data 804 and stored by cluster manager within metadata 822 for first entity 810A may indicate one or more availability zones in which this data is currently stored. After locating availability zones indicated in this tag, location module 940 sends information indicating the identified availability zones 942 to retrieval decision module 950.

Retrieval decision module 950 selects an availability zone 942 from which to retrieve set of data 804 or determines to retrieve the set of data from shared object storage 150 (e.g., if the requesting entity is classified as low-priority). For example, module 950 may determine which availability zone would provide for the most efficient retrieval of the data 804. That is, if a copy of set of data 804 is stored in the same availability zone as database node 120A, retrieval of the data from this same availability zone would be more efficient than retrieval of the data from an external availability zone. Retrieval decision module 950 outputs an identified cache (e.g., located in one of availability zones 942) for retrieval of set of data 804.

Database node 120A, in the illustrated embodiment, outputs database instructions 924. For example, database node 120A may transmit instructions 924 to storage cache 130A specifying to store the set of data 804 based on a tag assigned by tagging module 930. As another example, database node 120A may transmit instructions 924 to storage cache 130A requesting to retrieve the set of data 804 based on retrieval decision module 950 identifying cache 130A for retrieval of this data.

In some embodiments, the database instructions 924 generated by database node 120A specify an amount of time that data should be stored by one or more caches. For example, the instructions 924 may indicate to store set of data 804 for an hour, but to store data for another entity for only ten minutes e.g., based on the classification 912 for the first entity 810A and a classification for the other entity. As one specific example, data for a gold customer may be stored for a longer time than data for other customers.

Figure 10A:
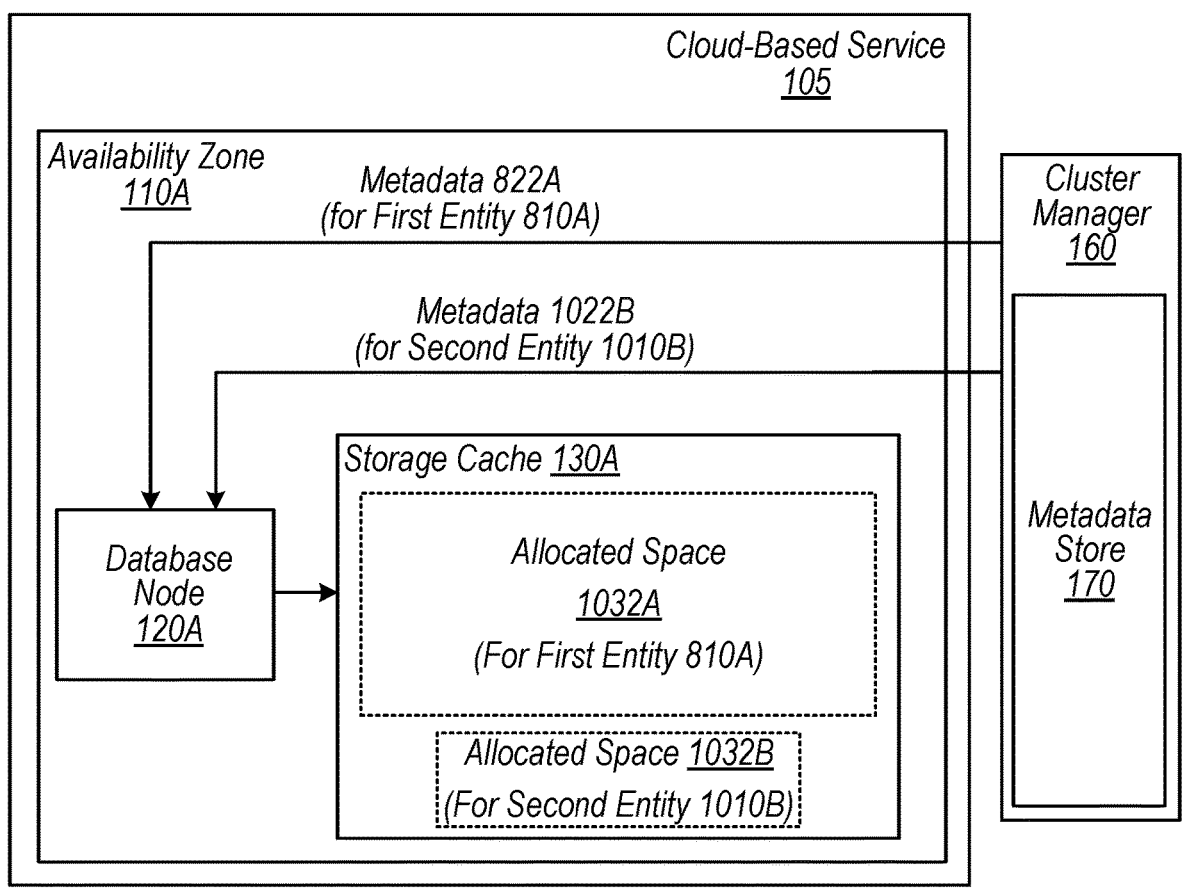
FIG. 10A is a block diagram illustrating example allocation of cache space based on entity classifications, according to some embodiments.

FIG. 10A is a block diagram illustrating example allocation of cache space based on entity classifications. In the illustrated embodiment, example 1000A shows example allocation of cache space for first and second entities 810A and 1010B based on metadata 822A and 1022B associated with these two entities.

In the illustrated embodiment, database node 120A retrieves metadata 822A for first entity 810A and metadata 1022B for second entity 1010B from cluster manager 160. Based on this metadata, database node 120A sends instructions to storage cache 130A specifying to allocate a larger amount of space 1032A for the first entity than for the second entity. In the illustrated embodiment, within storage cache 130A, allocated space 1032A for first entity 810A is larger than the allocated space 1032B for the second entity 1010B. Database node 120A may determine these space allocations based on the classifications specified in metadata 822A and 1022B for the two entities. For example, an entity classified as "high-priority" may have a larger amount of space allocated in storage caches 130 across various availability zones 1010 than another entity classified as "low-priority."

Note that a single storage cache 130A is shown in FIG. 10A for visibility, while in other embodiments, any of various other storage caches 130 may receive instructions from their respective database nodes 120 specifying amounts of space to allocated for different entities. In addition, different storage caches 130 may allocated the same or different amounts of space for a given entity. For example, storage cache 130A may allocate a different amount of space for first entity 810A than storage cache 130B.

In some embodiments, the storage space instructions sent by database node 120A include timing instructions. For example, in addition to specifying an amount of space to allocated for first entity 810A, database node 120A may specify an amount of time to retain information for first entity 810A in this allocated space 1032A. As one specific example, storage cache 130A is configured to store 100 objects, with ten of these object slots being allocated for a gold customer and one of these object slots being allocated for a bronze customer. In this specific example, database node 120A instructs storage cache 130A to retrain objects in the ten slots allocated for the gold customer for one hour and to retrain objects in the one slot for the bronze customer for only ten minutes.

In some embodiments, copies of a set of data for a given entity are stored in multiple caches across different availability zones. In other embodiments, a single copy of a set of data for a given entity is stored in a single cache. For example, based on first entity 810A having a high-priority classification, database node 120A stores data for this entity in both storage cache 130A as well as one or more caches located externally to availability zone 110A. As one specific example, a gold customer may have their data stored in multiple different availability zones (e.g., to ensure high-availability of their data), while a silver customer may have a single copy of their data stored in a local availability zone (e.g., providing for a lower availability of their data). Copies of data for a high-priority entity may be retrieved from a cache in a first availability zone for storage in caches in other availability zones. Data for low-priority entities, however, may be retrieved from shared storage cache 150, for example. That is, replication of data for high-priority entities occurs directly (e.g., is faster), while replication of data for low-priority entities occurs indirectly. Although retrieving data from across availability zones is faster than retrieving data from slower storage (e.g., shared object storage 150), this type of data retrieval is more expensive than the slower data retrieval. As such, data for lower-priority entities may not be served from across availability zones, but rather from the shared object storage.

In some embodiments, data for a second entity is evicted from a cache prior to data for a first entity. For example, when a storage cache reaches capacity, it will evict data stored for a silver customer prior to evicting data stored for a gold customer. A database node in the availability zone of this cache may instruct the cache to perform such evictions based on metadata received from cluster manager 160, for example.

In some embodiments, database node 120A is configured to prioritize storage of data for first entity 810A over storage of data for second entity 1010B based on classifications for these entities. For example, if database node 120A receives requests from first entity 810A and 1010B in parallel, database node 120A may store data for the first entity 810A in storage cache 130A prior to storing data for the second entity in cache 130A. In addition, if storage cache 130A is close to capacity when database node 120A receives the two write requests, database node 120A is configured to store data for the first entity 810A in storage cache 130A, but stores data for the second entity 1010B in shared object stored 150 (e.g., data for the second entity is not cached).

Handling a Cache Miss

In some embodiments, database nodes are configured to handle cache misses based on classifications of entities associated with the cache misses. For example, when database node 120A gets a read request (not shown in FIG. 10A) from first entity 810A and a cache miss occurs, this node is configured to retrieve data either from a slower source of memory (e.g., shared object storage 150) or from a storage cache in another availability zone based on the classification of the first entity. If first entity 810A is a gold customer, for example, database node 120A retrieves the requested data from a cache in another availability zone. That is, if the classification of first entity 810A indicates that copies of this entity's data are stored across multiple availability zones, then database node 120A will pull data from a storage cache in another availability zone in order to respond to the read request. In order to repopulate the cache with the missing data, however, database node 120A is configured to pull data from shared storage cache 150 (e.g., pull from slower memory in order to avoid the high cost associated with faster cross-zone data retrieval). As one specific example, retrieval of data across availability zones may take two milliseconds, while data retrieval from shared object storage 150 may take 100 milliseconds.

In situations in which an entity has a low-priority classification, database node 120A is configured to simply retrieve data from shared object storage 150. For example, a lower priority entity may not have copies of their data stored across availability zones and, thus, must wait longer to receive their requested data. In some situations, a lowest-priority entity (e.g., a bronze customer) may not get their data repopulated within the cache associated with the miss at all. In such situations, future requests for data received from this entity are simply fulfilled by retrieving data from shared object storage 150. In other situations, even if an entity has duplicates of their data stored across multiple availability zones, in case of a cache miss, this entity's data is retrieved from the shared object storage rather than across availability zones due to the classification of this entity (e.g., the entity is low-priority). As such, this entity may experience a higher-latency when retrieving their data than other entities (e.g., whose data is retrieved across availability zones).

Figure 10B:
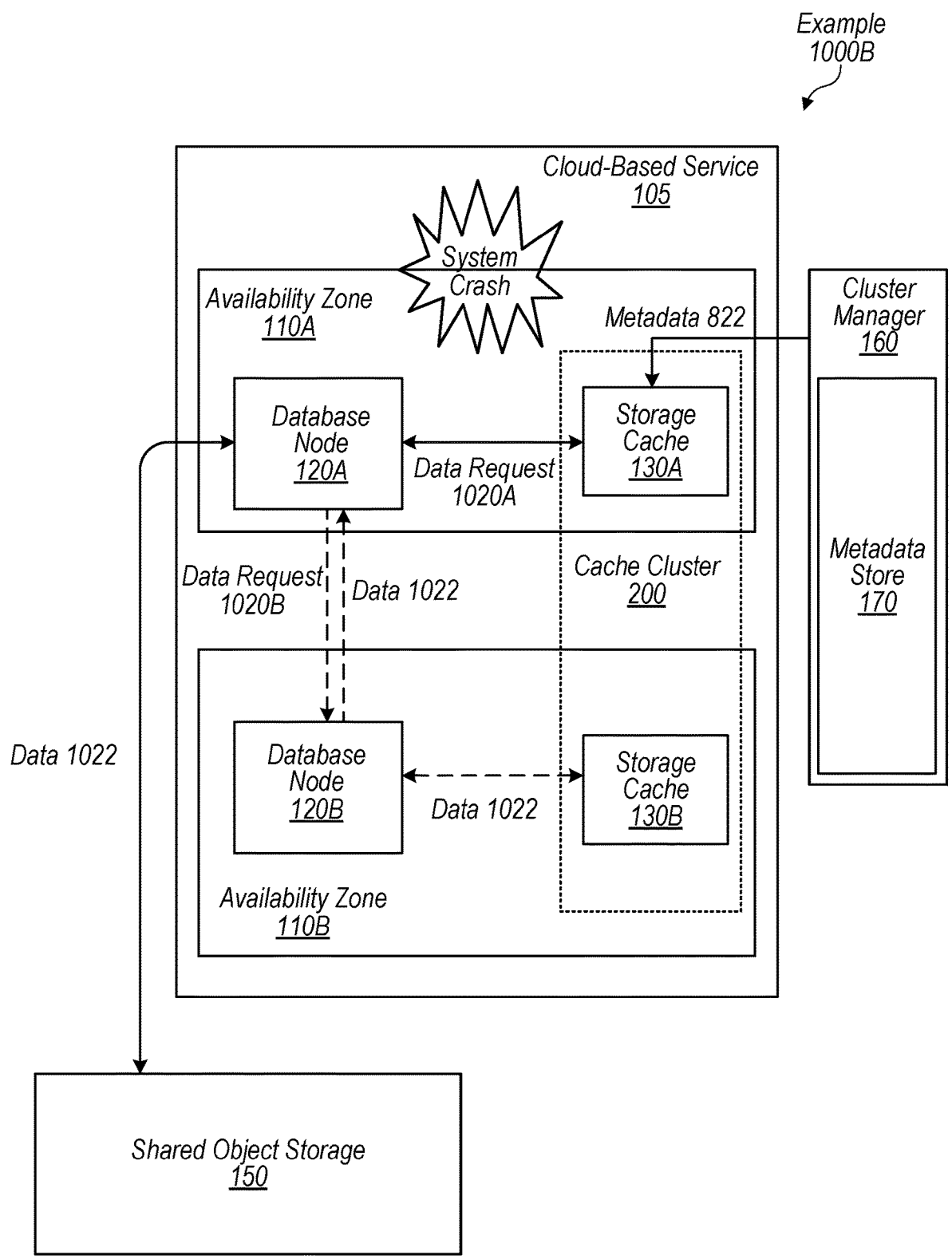
FIG. 10B is a block diagram illustrating an example system crash in a given availability zone, according to some embodiments.

FIG. 10B is a block diagram illustrating an example system crash in a given availability zone. In the illustrated embodiment, example 1000B shows a system crash occurring in availability zone 110A.

Availability node 110A, in the illustrated embodiment, experiences a system crash. This crash may be due to a power outage or some sort of system failure. This crash causes storage cache 130A to become temporarily unavailable, e.g., until cloud-based service 105 can bring this particular availability zone 110A back online. In the illustrated embodiment, when availability zone 110A recovers, storage cache 130A retrieves metadata 822 from cluster manager 160 in order to determine which data to retrieve and store for various entities. Based on this determination, cache 130A sends requests 1020A to database node 120A for data belonging to different entities. Database node 120A retrieves the requested data 1022 from shared object storage 150. For example, based on metadata 822 for a first entity specifying that it is a high-priority entity, storage cache 130A sends a request to database node 120A indicating to retrieve data for the first entity from a cache in another availability zone. As another example, based on metadata 822 for a second entity specifying that this is a low-priority entity, storage cache sends a request to database node 120A indicating to retrieve data for the second entity from shared object storage 150. As yet another example, when cache 130A comes back online after the system crash, it may determine based on metadata 822 for a third entity not to repopulate data for this entity at all. That is, storage cache 130A may not immediately repopulate data for this third entity. Rather, storage cache 130A may wait until the third entity submits read requests for this data prior to asking database node 120A to retrieve the data from shared object storage 150 (at which time the data is also cached for the third entity).

Database node 120A, in the illustrated embodiment, may send data request 1020B to database node 120B e.g., based on data request 1020A from storage cache 130A specifying to retrieve data across availability zones (rather than from shared object storage 150). Database node 120B may retrieve data 1022 from storage cache 130B. Then, database node 120B may provide data 1022 to database node 120A for storage in cache 130A.

Example Methods

Figure 11:
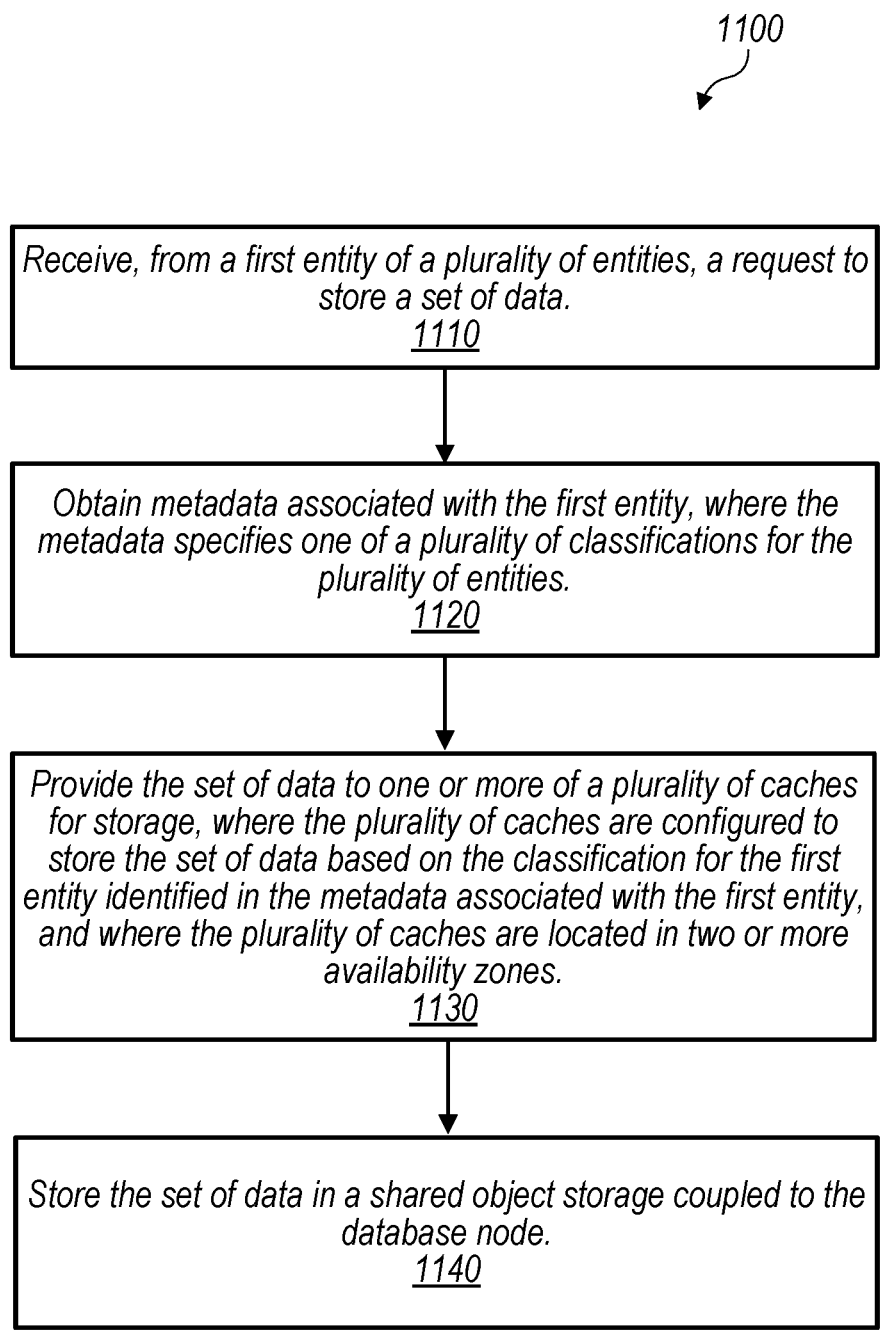
FIG. 11 is a flow diagram illustrating an example method for handling write requests using class-based techniques, according to some embodiments.

FIG. 11 is a flow diagram illustrating an example method for handling write requests using class-based techniques, according to some embodiments. Method 1100 shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 1100 may be performed by database node 120A, for example.

At element 1110, in the illustrated embodiment, a database node of a distributed storage system receives, from a first entity of a plurality of entities, a request to store a set of data. In some embodiments, the database node receives, from a second entity of the plurality of entities, a request for a second set of data. In some embodiments, the database node identifies, based on metadata associated with the second entity, a first cache of the plurality of caches storing the second set of data, where the first cache is located in a first availability zone. In some embodiments, the database node responds to the request for the second set of data, wherein the responding is performed based on retrieving the second set of data from the first cache.

In some embodiments, the database node determines that a cache miss has occurred in the first cache. In some embodiments, the database node determines, based on a classification of an entity associated with the cache miss, whether to service a query for data missing from the first cache using data from the shared object storage. In some embodiments, the database node receives, from a second entity of the plurality of entities, a request for a second set of data. In some embodiments, the database node retrieves, from the shared object storage, the second set of data, where the retrieving is performed based on a classification indicated in metadata associated with the second entity.

At 1120, the database node obtains metadata associated with the first entity, where the metadata specifies one of a plurality of classifications for the plurality of entities. In some embodiments, the database node obtains the metadata by receiving, from a cluster manager of the distributed storage system, metadata associated with different ones of the plurality of entities, wherein the metadata includes tags maintained by the cluster manager for different sets of data based on classifications for entities associated with the different sets of data. In some embodiments, a tag for the set of data indicates respective availability zones of a number of caches storing copies of the set of data.

In some embodiments, the plurality of caches are further configured to store, based on the classification for the first entity, multiple copies of data for the first entity across different availability zones. In some embodiments, the plurality of caches are further configured to store, based on a classification for a second entity of the plurality of entities, a single copy of data for the second entity. In some embodiments, the plurality of caches are further configured to perform, based on the classification for the second entity, cache evictions of data stored for the second entity prior to performing cache evictions of data stored for the first entity. In various embodiments, the plurality of caches are configured to store data according to various different standards of latency (e.g., the speed at which an entity is able to retrieve their data), storage size allocation, rapid refresh of the cache, etc. based on the classifications of different entities.

At 1130, the database node provides the set of data to one or more of a plurality of caches for storage, where the plurality of caches are configured to store the set of data based on the classification for the first entity identified in the metadata associated with the first entity, and where the plurality of caches are located in two of more availability zones. In some embodiments, the plurality of caches are further configured to allocate a larger amount of cache space for the first entity than for a second entity of the plurality of entities based on a classification for the first entity indicated in the metadata associated with the first entity and a classification for the second entity indicated in metadata associated with the second entity. For example, a gold customer may be allocated more space in the plurality of storage caches than a silver customer.

At 1140 the database node stores the set of data in a shared object storage coupled to the database node. In some embodiments, in response to a system failure, the plurality of caches are configured to determine, based on the classification for the first entity, to repopulate data for the first entity into one or more of the plurality of caches from the shared object storage. In some embodiments, in response to a system failure, the plurality of caches are configured to determine, based on a classification for a second entity, to not repopulate data for a second entity of the plurality of entities into one or more of the plurality of caches, wherein repopulating data for the first entity is performed without being provoked by a cache miss.

In some embodiments, the plurality of caches prioritize, based on the classification for the first entity, storage of data for the first entity over storage of data for a second entity of the plurality of entities. In some embodiments, a first availability zone includes a first cache that replicates data for at least one other cache in a second availability zone.

Figure 12:
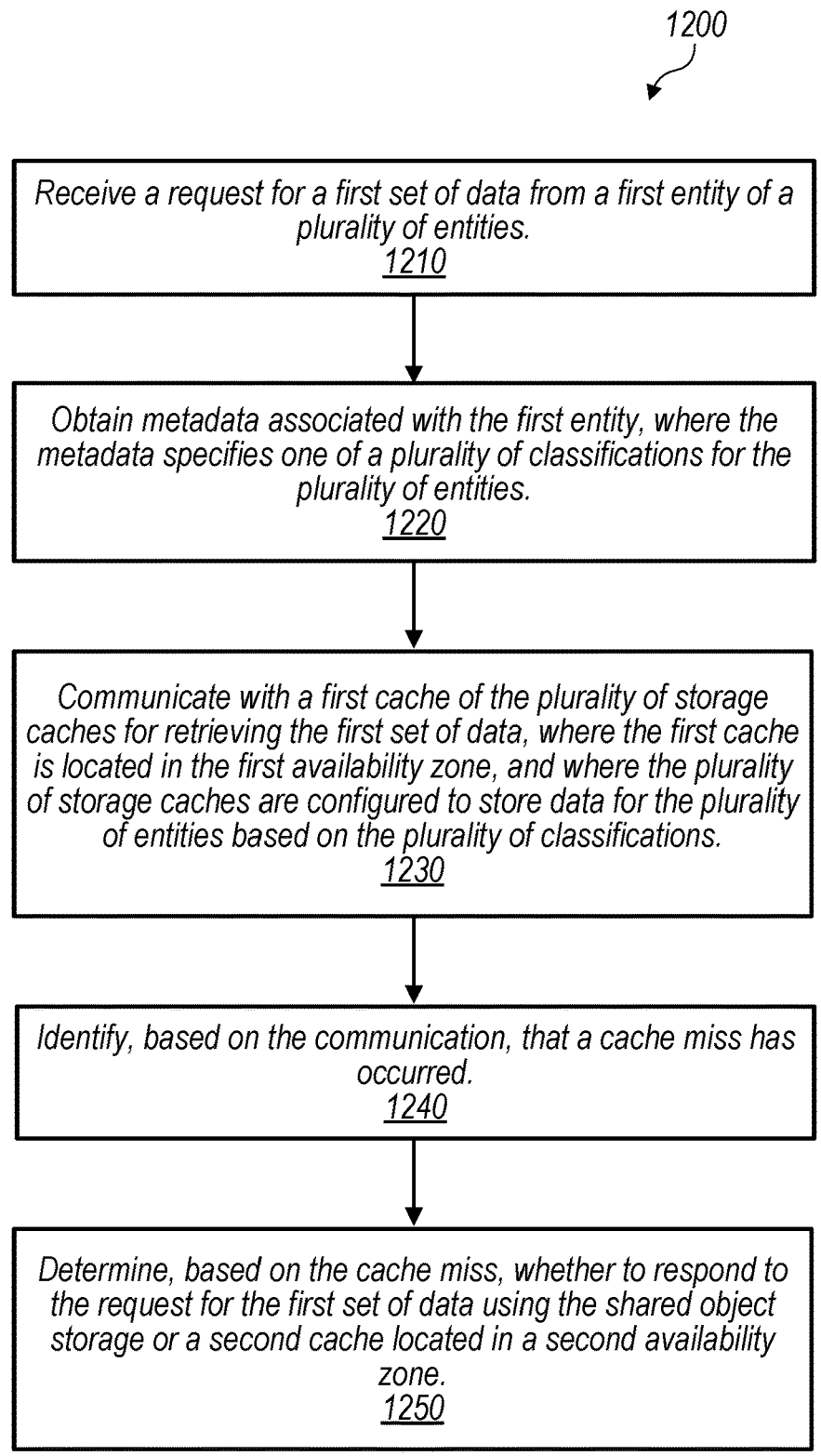
FIG. 12 is a block diagram illustrating an example method for handling read requests for data stored in one or more caches using class-based techniques, according to some embodiments.

FIG. 12 is a block diagram illustrating an example method for handling read requests for data stored in one or more caches using class-based techniques, according to some embodiments. Method 1200 shown in FIG. 12 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 1200 may be performed by database node 120B, for example.

At element 1210, in the illustrated embodiment, a first database node in a first availability zone receives a request for a first set of data from a first entity of a plurality of entities. In some embodiments, the first database node is further configured to receive, from the first entity, a request to store a second set of data. In some embodiments, the first database node is further configured to provide the second set of data to one or more of a plurality of caches for storage and store the second set of data in a shared object storage. In some embodiments, providing the second set of data to the one or more of the plurality of caches for storage includes providing instructions specifying to store multiple copies of the second set of data in multiple caches located across different availability zones, where the instructions are provided based on a classification for the first entity specified in the metadata associated with the first entity.

At 1220, the first database node obtains metadata associated with the first entity, where the metadata specifies one of a plurality of classifications for the plurality of entities. In some embodiments, the metadata associated with the first entity is obtained from a cluster manager of the distributed storage system, where metadata maintained by the cluster manager for different ones of the plurality of entities indicates respective availability zones in which data for different ones of the plurality of entities are stored.

At 1230, the database node communicates with a first cache of the plurality of storage caches for retrieving the first set of data, where the first cache is located in the first availability zone, and where the plurality of storage caches are configured to store data for the plurality of entities based on the plurality of classifications.

At 1240, the database node identifies, based on the communication, that a cache miss has occurred. For example, a cache from which database node was attempting to retrieve the first set of data is not currently storing the first set of data. Thus, the cache returns a message indicating the lack of data to the database node.

At 1250, the database node determines, based on the cache miss, whether to respond to the request for the first set of data using the shared object storage or a second cache located in a second availability zone. In some embodiments, in response to a system failure, the plurality of caches are further configured to determine, based on a classification for the first entity, to repopulate data for the first entity into one or more of the plurality of caches using data retrieved from the shared object storage. In some embodiments, in response to a system failure, the plurality of caches are further configured to determine, based on a classification for a second entity, to not repopulate data for the second entity into one or more of the plurality of storage caches, wherein repopulating data for the first entity is performed without being provoked by a cache miss.

Figure 13:
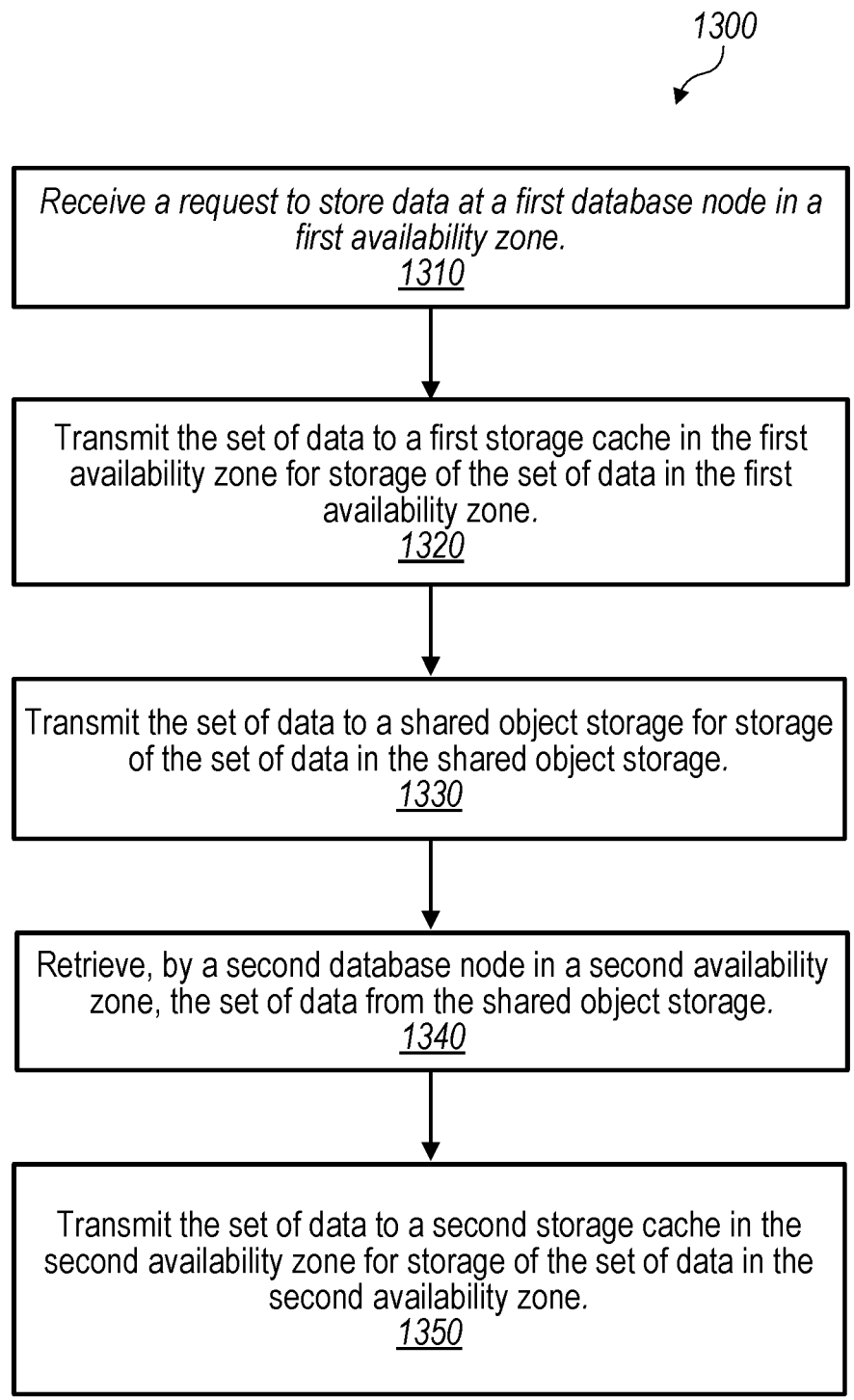
FIG. 13 is a flow diagram illustrating an example method for handling write requests in a cloud-based service, according to some embodiments.

FIG. 13 is a flow diagram illustrating an example method for handling write requests in a cloud-based service, according to some embodiments. Method 1300, shown in FIG. 13, may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 1300 may be performed by executing a set of program instructions stored on a non-transitory computer-readable medium.

At 1310, in the illustrated embodiment, a request to store a set of data is received at a first database node in a first availability zone.

At 1320, in the illustrated embodiment, the first database node transmits the set of data to a first storage cache in the first availability zone for storage of the set of data in the first availability zone. In some embodiments, the first database node is operable to retrieve requested data from the first storage cache in the first availability zone in response to a database query.

At 1330, in the illustrated embodiment, the first database node transmits the set of data to a shared object storage for storage of the set of data in the first availability zone.

At 1340, in the illustrated embodiment, a second database node in a second availability zone retrieves the set of data from the shared object storage. In some embodiments, the second database node in the second availability zone is operable to retrieve the set of data from the shared object storage in response to a data failure in the second storage cache. In some embodiments, the second database node in the second availability zone is operable to retrieve the set of data from the shared object storage in response to a determination that the set of data in the shared object storage includes an update for a set of data stored by the second storage cache in the second availability zone.

At 1350, in the illustrated embodiment, the second database node transmits the set of data to a second storage cache in the second availability zone for storage of the set of data in the second availability zone. In some embodiments, the second database node is operable to retrieve the requested data from the second storage cache in the second availability zone when the requested data is not found in the first storage cache in the first availability zone. In some embodiments, the first database node or the second database node is operable to retrieve data from the shared object storage when the requested data is not found in either the first storage cache in the first availability zone or the second storage cache in the second availability zone.

In some embodiments, the storage caches are hosted by servers that store cached data in internal non-volatile memories and the shared object storage is a persistent object storage. In some embodiments, the database nodes are operable to transmit a log for operations by the plurality of database nodes to a log storage cluster for storage in log storage elements separated into two or more availability zones, the availability zones for the log storage elements corresponding to the availability zones for the storage caches. In some embodiments, the log for a specified availability zone of the storage caches is stored in an availability zone of the log storage elements that corresponds to the specified availability zone.

Figure 14:
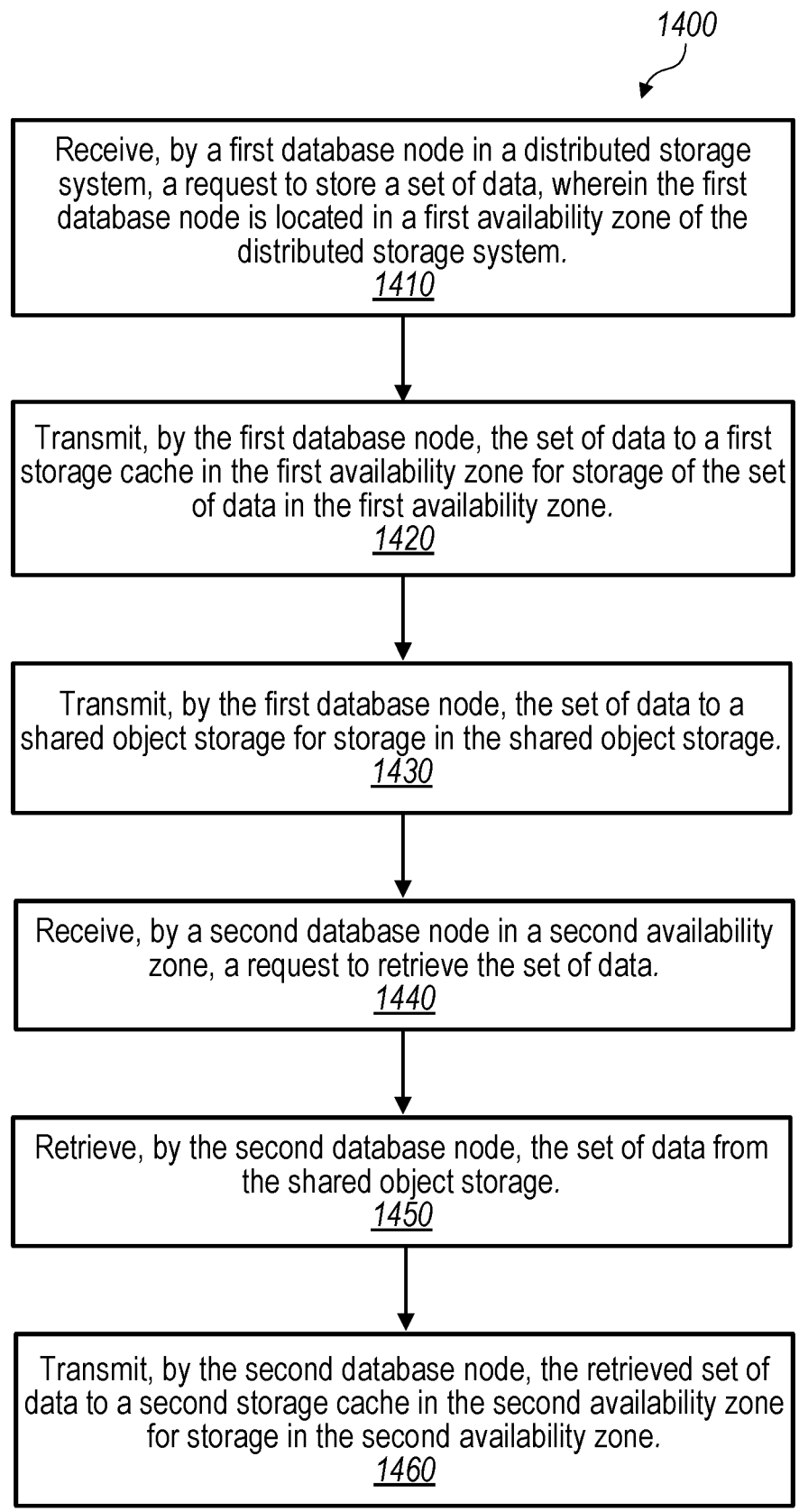
FIG. 14 is a flow diagram illustrating another example method for handling write requests in a cloud-based service, according to some embodiments.

FIG. 14 is a flow diagram illustrating another example method for handling write requests in a cloud-based service, according to some embodiments. Method 1400, shown in FIG. 14, may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 1400 may be performed by executing a set of program instructions stored on a non-transitory computer-readable medium.

At 1410, in the illustrated embodiment, a first database node in a distributed storage system receives a request to store a set of data, wherein the first database node is located in a first availability zone of the distributed storage system. In some embodiments, the first database node transmits a log of the storing of the set of data in the first storage cache in the first availability zone to a log storage cluster having a plurality of log storage elements and the log is stored in a first availability zone of the log storage elements that corresponds to the first availability zone in the cache cluster.

At 1420, in the illustrated embodiment, the first database node transmits the set of data to a first storage cache in the first availability zone for storage of the set of data in the first availability zone.

At 1430, in the illustrated embodiment, the first database node transmits the set of data to a shared object storage for storage of the set of data in the first availability zone.

At 1440, in the illustrated embodiment, a second database node in a second availability zone receives a request to retrieve the set of data.

At 1450, in the illustrated embodiments, the second database node retrieves the set of data from the shared object storage. In some embodiments, the second database node determines to retrieve a version of the set of data from the shared object storage in response to a determination that a version the set of data in the second storage cache is missing, invalid, or older than the version of the set of data in the shared object storage.

At 1460, in the illustrated embodiment, the second database node transmits the set of data to a second storage cache in the second availability zone for storage of the set of data in the second availability zone. In some embodiments, the second database node transmits the retrieved set of data to an entity initiating the request.

In some embodiments, the first database node transmits metadata for the transmission and storage of the set of data in the shared object storage and the first storage cache to a cluster manager. In some embodiments, the second database node retrieves the metadata from the cluster manager in response to the request and determines, based on the metadata, to retrieve the set of data from the shared object storage to satisfy the request. In some embodiments, determining to retrieve the set of data from the shared object storage includes determining that a version of the set of data in the first storage cache and the shared object storage is updated compared to a version of the set of data in the second storage cache.

In some embodiments, the first database node retrieves a version of the set of data from the shared object storage in response to a failure of the set of data in the first storage cache in the first availability zone and replaces the set of data with the failure in the first storage cache in the first availability zone with the retrieved version of the set of data.

In some embodiments, a third database node in a third availability zone receives a request to retrieve the set of data, retrieves the set of data from the shared object storage, and transmits the retrieved set of data to a third storage cache in the third availability zone for storage in the third availability zone.

Exemplary Multi-Tenant Database System

Figure 15:
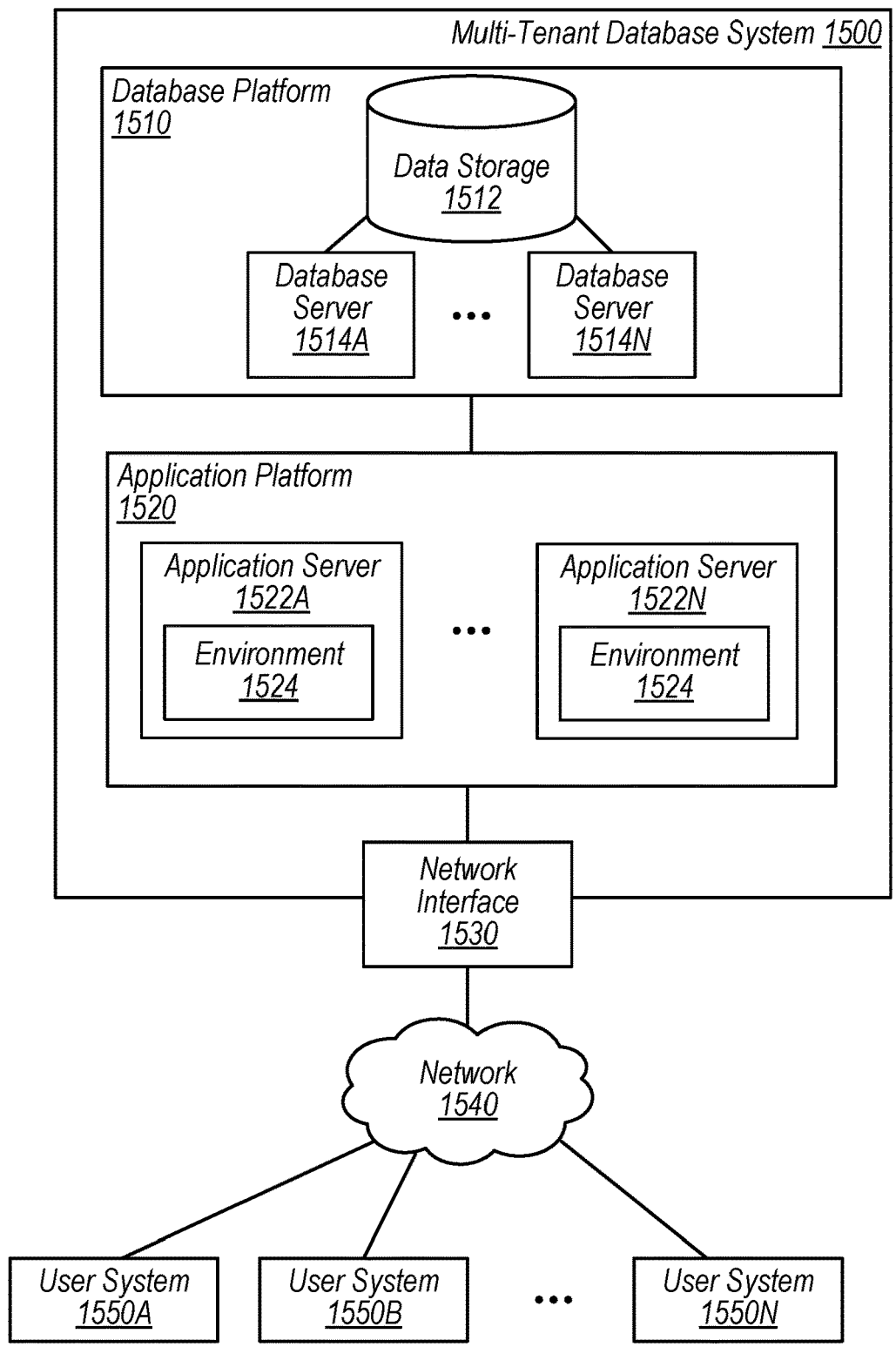
FIG. 15 depicts an exemplary multi-tenant database system (MTS) in which various techniques of the present disclosure can be implemented.

Turning now to FIG. 15, an exemplary multi-tenant database system (MTS) 1500 in which various techniques of the present disclosure can be implemented is shown. In FIG. 15, MTS 1500 includes a database platform 1510, an application platform 1520, and a network interface 1530 connected to a network 1540. Also as shown, database platform 1510 includes a data storage 1512 and a set of database servers 1514A-N that interact with data storage 1512, and application platform 1520 includes a set of application servers 1522A-N having respective environments 1524. In the illustrated embodiment, MTS 1500 is connected to various user systems 1550A-N through network 1540. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 1500, in various embodiments, is a set of computer systems that together provide various services to users (alternatively referred to as "tenants") that interact with MTS 1500. In some embodiments, MTS 1500 implements a customer relationship management (CRM) system that provides mechanism for tenants (e.g., companies, government bodies, etc.) to manage their relationships and interactions with customers and potential customers. For example, MTS 1500 might enable tenants to store customer contact information (e.g., a customer's website, email address, telephone number, and social media data), identify sales opportunities, record service issues, and manage marketing campaigns. Furthermore, MTS 1500 may enable those tenants to identify how customers have been communicated with, what the customers have bought, when the customers last purchased items, and what the customers paid. To provide the services of a CRM system and/or other services, as shown, MTS 1500 includes a database platform 1510 and an application platform 1520.

Database platform 1510, in various embodiments, is a combination of hardware elements and software routines that implement database services for storing and managing data of MTS 1500, including tenant data. As shown, database platform 1510 includes data storage 1512. Data storage 1512, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 1512 is used to implement a database (e.g., cloud-based service 105) comprising a collection of information that is organized in a way that allows for access, storage, and manipulation of the information. Data storage 1512 may implement a single database, a distributed database, a collection of distributed databases, a database with redundant online or offline backups or other redundancies, etc. As part of implementing the database, data storage 1512 may store files (e.g., set of data 204) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 1500 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 1512 is organized as part of a log-structured merge-tree (LSM tree). An LSM tree normally includes two high-level components: an in-memory buffer and a persistent storage. In operation, a database server 1514 may initially write database records into a local in-memory buffer before later flushing those records to the persistent storage (e.g., data storage 1512). As part of flushing database records, the database server 1514 may write the database records into new files that are included in a "top" level of the LSM tree. Over time, the database records may be rewritten by database servers 1514 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 1512.

When a database server 1514 wishes to access a database record for a particular key, the database server 1514 may traverse the different levels of the LSM tree for files that potentially include a database record for that particular key. If the database server 1514 determines that a file may include a relevant database record, the database server 1514 may fetch the file from data storage 1512 into a memory of the database server 1514. The database server 1514 may then check the fetched file for a database record having the particular key. In various embodiments, database records are immutable once written to data storage 1512. Accordingly, if the database server 1514 wishes to modify the value of a row of a table (which may be identified from the accessed database record), the database server 1514 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 1514, in various embodiments, are hardware elements, software routines, or a combination thereof capable of providing database services, such as data storage, data retrieval, and/or data manipulation. A database server 1514 may correspond to database node 120. Such database services may be provided by database servers 1514 to components (e.g., application servers 1522) within MTS 1500 and to components external to MTS 1500. As an example, a database server 1514 may receive a database transaction request from an application server 1522 that is requesting data to be written to or read from data storage 1512. The database transaction request may specify an SQL SELECT command to select one or more rows from one or more database tables. The contents of a row may be defined in a database record and thus database server 1514 may locate and return one or more database records that correspond to the selected one or more table rows. In various cases, the database transaction request may instruct database server 1514 to write one or more database records for the LSM tree—database servers 1514 maintain the LSM tree implemented on database platform 1510. In some embodiments, database servers 1514 implement a relational database management system (RDMS) or object oriented database management system (OODBMS) that facilitates storage and retrieval of information against data storage 1512. In various cases, database servers 1514 may communicate with each other to facilitate the processing of transactions. For example, database server 1514A may communicate with database server 1514N to determine if database server 1514N has written a database record into its in-memory buffer for a particular key.

Application platform 1520, in various embodiments, is a combination of hardware elements and software routines that implement and execute CRM software applications as well as provide related data, code, forms, web pages and other information to and from user systems 1550 and store related data, objects, web page content, and other tenant information via database platform 1510. In order to facilitate these services, in various embodiments, application platform 1520 communicates with database platform 1510 to store, access, and manipulate data. In some instances, application platform 1520 may communicate with database platform 1510 via different network connections. For example, one application server 1522 may be coupled via a local area network and another application server 1522 may be coupled via a direct network link. Transfer Control Protocol and Internet Protocol (TCP/IP) are exemplary protocols for communicating between application platform 1520 and database platform 1510, however, it will be apparent to those skilled in the art that other transport protocols may be used depending on the network interconnect used.

Application servers 1522, in various embodiments, are hardware elements, software routines, or a combination thereof capable of providing services of application platform 1520, including processing requests received from tenants of MTS 1500. Application servers 1522, in various embodiments, can spawn environments 1524 that are usable for various purposes, such as providing functionality for developers to develop, execute, and manage applications (e.g., business logic). Data may be transferred into an environment 1524 from another environment 1524 and/or from database platform 1510. In some cases, environments 1524 cannot access data from other environments 1524 unless such data is expressly shared. In some embodiments, multiple environments 1524 can be associated with a single tenant.

Application platform 1520 may provide user systems 1550 access to multiple, different hosted (standard and/or custom) applications, including a CRM application and/or applications developed by tenants. In various embodiments, application platform 1520 may manage creation of the applications, testing of the applications, storage of the applications into database objects at data storage 1512, execution of the applications in an environment 1524 (e.g., a virtual machine of a process space), or any combination thereof. In some embodiments, application platform 1520 may add and remove application servers 1522 from a server pool at any time for any reason, there may be no server affinity for a user and/or organization to a specific application server 1522. In some embodiments, an interface system (not shown) implementing a load balancing function (e.g., an F5 Big-IP load balancer) is located between the application servers 1522 and the user systems 1550 and is configured to distribute requests to the application servers 1522. In some embodiments, the load balancer uses a least connections algorithm to route user requests to the application servers 1522. Other examples of load balancing algorithms, such as are round robin and observed response time, also can be used. For example, in certain embodiments, three consecutive requests from the same user could hit three different servers 1522, and three requests from different users could hit the same server 1522.

In some embodiments, MTS 1500 provides security mechanisms, such as encryption, to keep each tenant's data separate unless the data is shared. If more than one server 1514 or 1522 is used, they may be located in close proximity to one another (e.g., in a server farm located in a single building or campus), or they may be distributed at locations remote from one another (e.g., one or more servers 1514 located in city A and one or more servers 1522 located in city B). Accordingly, MTS 1500 may include one or more logically and/or physically connected servers distributed locally or across one or more geographic locations.

One or more users (e.g., via user systems 1550) may interact with MTS 1500 via network 1540. User system 1550 may correspond to, for example, a tenant of MTS 1500, a provider (e.g., an administrator) of MTS 1500, or a third party. Each user system 1550 may be a desktop personal computer, workstation, laptop, PDA, cell phone, or any Wireless Access Protocol (WAP) enabled device or any other computing device capable of interfacing directly or indirectly to the Internet or other network connection. User system 1550 may include dedicated hardware configured to interface with MTS 1500 over network 1540. User system 1550 may execute a graphical user interface (GUI) corresponding to MTS 1500, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 1550 to access, process, and view information and pages available to it from MTS 1500 over network 1540. Each user system 1550 may include one or more user interface devices, such as a keyboard, a mouse, touch screen, pen, or the like, for interacting with a graphical user interface (GUI) provided by the browser on a display monitor screen, LCD display, etc. in conjunction with pages, forms and other information provided by MTS 1500 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 1550 may be users in differing capacities, the capacity of a particular user system 1550 might be determined one or more permission levels associated with the current user. For example, when a salesperson is using a particular user system 1550 to interact with MTS 1500, that user system 1550 may have capacities (e.g., user privileges) allotted to that salesperson. But when an administrator is using the same user system 1550 to interact with MTS 1500, the user system 1550 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 1500 that are allocated at the tenant level while other data structures are managed at the user level.

In some embodiments, a user system 1550 and its components are configurable using applications, such as a browser, that include computer code executable on one or more processing elements. Similarly, in some embodiments, MTS 1500 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 1540 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 1550 may communicate with MTS 1500 using TCP/IP and, at a higher network level, use other common Internet protocols to communicate, such as HTTP, FTP, AFS, WAP, etc. For example, where HTTP is used, user system 1550 might include an HTTP client commonly referred to as a "browser" for sending and receiving HTTP messages from an HTTP server at MTS 1500. Such a server might be implemented as the sole network interface between MTS 1500 and network 1540, but other techniques might be used as well or instead. In some implementations, the interface between MTS 1500 and network 1540 includes load sharing functionality, such as round-robin HTTP request distributors to balance loads and distribute incoming HTTP requests evenly over a plurality of servers.

In various embodiments, user systems 1550 communicate with application servers 1522 to request and update system-level and tenant-level data from MTS 1500 that may require one or more queries to data storage 1512. In some embodiments, MTS 1500 automatically generates one or more SQL statements (the SQL query) designed to access the desired information. In some cases, user systems 1550 may generate requests having a specific format corresponding to at least a portion of MTS 1500. As an example, user systems 1550 may request to move data objects into a particular environment using an object notation that describes an object relationship mapping (e.g., a JavaScript object notation mapping) of the specified plurality of objects.

Exemplary Computer System

Figure 16:
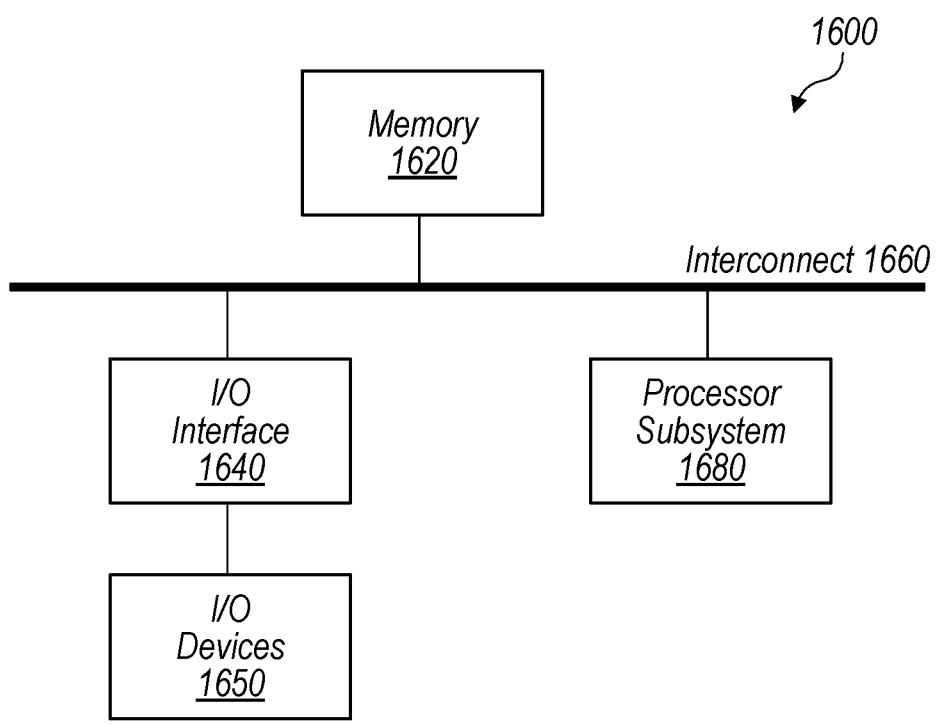
FIG. 16 depicts a block diagram of an exemplary computer system.

Turning now to FIG. 16, a block diagram of an exemplary computer system 1600, which may implement cloud environment 100, cloud-based service 105, database nodes 120, storage caches 130, log storages 140, shared object storage 150, cluster manager 160, MTS 1500, and/or user system 1550, is depicted. Computer system 1600 includes a processor subsystem 1680 that is coupled to a system memory 1620 and I/O interfaces(s) 1640 via an interconnect 1660 (e.g., a system bus). I/O interface(s) 1640 is coupled to one or more I/O devices 1650. Although a single computer system 1600 is shown in FIG. 16 for convenience, system 1600 may also be implemented as two or more computer systems operating together.

Processor subsystem 1680 may include one or more processors or processing units. In various embodiments of computer system 1600, multiple instances of processor subsystem 1680 may be coupled to interconnect 1660. In various embodiments, processor subsystem 1680 (or each processor unit within 1680) may contain a cache or other form of on-board memory.

System memory 1620 is usable store program instructions executable by processor subsystem 1680 to cause system 1600 perform various operations described herein. System memory 1620 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1600 is not limited to primary storage such as memory 1620. Rather, computer system 1600 may also include other forms of storage such as cache memory in processor subsystem 1680 and secondary storage on I/O Devices 1650 (e.g., a hard drive, storage array, etc.). In some embodiments, these other forms of storage may also store program instructions executable by processor subsystem 1680.

I/O interfaces 1640 may be any of various types of interfaces configured to couple to and communicate with other devices, according to various embodiments. In one embodiment, I/O interface 1640 is a bridge chip (e.g., Southbridge) from a front-side to one or more back-side buses. I/O interfaces 1640 may be coupled to one or more I/O devices 1650 via one or more corresponding buses or other interfaces. Examples of I/O devices 1650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1600 is coupled to a network via a network interface device 1650 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other components outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first database node," "second database node," "particular database node," "given database node," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "nodes," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a node, a system having a processor unit and a memory storing program instructions executable to implement the task, etc. This phrase is not used herein to refer to something intangible.

In some cases, various units/nodes/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for managing distributed data storage using a plurality of caches and a shared object storage, comprising:
   receiving, by a database node of a distributed storage system from a first entity of a plurality of entities, a request to store a set of data;
   obtaining, by the database node, metadata associated with the first entity, wherein the metadata specifies one of a plurality of classifications for the plurality of entities, and wherein the distributed storage system manages distributed storage of data for the plurality of entities;
   providing, by the database node, the set of data to one or more of the plurality of caches for storage, wherein the plurality of caches are configured to store the set of data based on a classification for the first entity identified in the metadata associated with the first entity, and wherein the plurality of caches are located in two or more availability zones that are geographically separated and across which data is replicated; and
   storing, by the database node in the shared object storage coupled to the database node, the set of data, wherein the shared object storage provides a higher bandwidth than the plurality of caches.

2. The method of claim 1, wherein the obtaining is performed by:
   receiving, from a cluster manager of the distributed storage system, metadata associated with different ones of the plurality of entities, wherein the metadata includes tags maintained by the cluster manager for different sets of data based on classifications for entities associated with the different sets of data.

3. The method of claim 2, wherein a tag for the set of data indicates respective availability zones of a number of caches storing copies of the set of data.

4. The method of claim 1, wherein the plurality of caches are further configured to allocate a larger amount of cache space for the first entity than for a second entity of the plurality of entities based on a classification for the first entity indicated in the metadata associated with the first entity and a classification for the second entity indicated in metadata associated with the second entity.

5. The method of claim 1, wherein the plurality of caches are further configured to:
   in response to a system failure:
      determine, based on the classification for the first entity, to repopulate data for the first entity into one or more of the plurality of caches from the shared object storage; and
      determine, based on a classification for a second entity, to not repopulate data for the second entity of the plurality of entities into one or more of the plurality of caches, wherein repopulating data for the first entity is performed without being provoked by a cache miss.

6. The method of claim 1, wherein the plurality of caches are further configured to:
   store, based on the classification for the first entity, multiple copies of data for the first entity across different availability zones; and
   store, based on a classification for a second entity of the plurality of entities, a single copy of data for the second entity.

7. The method of claim 1, wherein the plurality of caches are further configured to:
   perform, based on a classification for a second entity, cache evictions of data stored for the second entity prior to performing cache evictions of data stored for the first entity.

8. The method of claim 1, further comprising:
   receiving, by the database node from a second entity of the plurality of entities, a request for a second set of data;
   identifying, by the database node based on metadata associated with the second entity, a first cache of the plurality of caches storing the second set of data, wherein the first cache is located in a first availability zone; and
   responding, by the database node, to the request for the second set of data, wherein the responding is performed based on retrieving the second set of data from the first cache.

9. The method of claim 8, further comprising:
   determining, by the database node, that a cache miss has occurred in the first cache; and
   determining, by the database node based on a classification of an entity associated with the cache miss, whether to service a query for data missing from the first cache using data from the shared object storage.

10. The method of claim 1, further comprising:
receiving, by the database node from a second entity of the plurality of entities, a request for a second set of data; and
retrieving, by the database node from the shared object storage, the second set of data, wherein the retrieving is performed based on a classification indicated in metadata associated with the second entity.

11. A distributed storage system, comprising:
at least one processor;
a data cluster comprising a plurality of storage caches separated into a plurality of availability zones;
a shared object storage coupled to the data cluster;
a plurality of database nodes located in the plurality of availability zones that are geographically distributed and across which data is replicated; and
wherein a first database node in a first availability zone is executable by the at least one processor to cause the distributed storage system to:
receive a request for a first set of data from a first entity of a plurality of entities for which the distributed storage system managed distributed storage of data;
obtain metadata associated with the first entity, wherein the metadata specifies one of a plurality of classifications for the plurality of entities;
communicate with a first cache of the plurality of storage caches for retrieving the first set of data, wherein the first cache is located in the first availability zone, and wherein the plurality of storage caches are configured to store data for the plurality of entities based on the plurality of classifications;
identify, based on the communication, that a cache miss has occurred;
determine, based on the cache miss and a classification for the first entity specified in the metadata associated with the first entity, whether to respond to the request for the first set of data using the shared object storage or a second cache located in a second availability zone, wherein the plurality of storage caches provide lower latency data retrieval than the shared object storage; and
respond, based on determining to use the second cache located in the second availability zone, to the request for the first set of data.

12. The distributed storage system of claim 11, wherein the metadata associated with the first entity is obtained from a cluster manager of the distributed storage system, wherein metadata maintained by the cluster manager for different ones of the plurality of entities indicates respective availability zones in which data for different ones of the plurality of entities are stored.

13. The distributed storage system of claim 11, wherein the first database node is further configured to:
receive, from the first entity, a request to store a second set of data;
provide the second set of data to one or more of a plurality of caches for storage; and
store the second set of data in the shared object storage.

14. The distributed storage system of claim 13, wherein providing the second set of data to the one or more of the plurality of caches for storage includes providing instructions specifying to store multiple copies of the second set of data in multiple caches located across different availability zones, wherein the instructions are provided based on the classification for the first entity.

15. The distributed storage system of claim 11, wherein the plurality of storage caches are further configured to:
in response to a system failure:
determine, based on the classification for the first entity, to repopulate data for the first entity into one or more of the plurality of caches using data retrieved from the shared object storage; and
determine, based on a classification for a second entity, to not repopulate data for the second entity into one or more of the plurality of storage caches, wherein repopulating data for the first entity is performed without being provoked by a cache miss.

16. A non-transitory computer-readable medium having instructions stored thereon that are capable of causing a distributed storage system to implement operations comprising:
receiving, from a first entity of a plurality of entities, a request to store a set of data;
obtaining metadata associated with the first entity, wherein the metadata specifies one of a plurality of classifications for the plurality of entities, and wherein the distributed storage system manages distributed storage of data for the plurality of entities;
providing the set of data to one or more of a plurality of caches for storage, wherein the plurality of caches are configured to store the set of data based on a classification for the first entity identified in the metadata, and wherein the plurality of caches are separated into a plurality of availability zones that are geographically separated and across which data is replicated; and
storing the set of data in a shared object storage, wherein the shared object storage provides a higher bandwidth than the plurality of caches.

17. The non-transitory computer-readable medium of claim 16, wherein the metadata further specifies a tag for the set of data that indicates:
a number of caches that store copies of the set of data; and
respective availability zones of the number of caches storing copies of the set of data.

18. The non-transitory computer-readable medium of claim 16, wherein the operations comprise the plurality of caches:
prioritizing, based on the classification for the first entity, storage of data for the first entity over storage of data for a second entity of the plurality of entities.

19. The non-transitory computer-readable medium of claim 16, wherein a first availability zone includes a first cache that replicates data for at least one other cache in a second availability zone.

20. The non-transitory computer-readable medium of claim 16, wherein the operations further comprise:
receiving, from a second entity of the plurality of entities, a request for a second set of data;
identifying, based on metadata associated with the second entity, a first cache of the plurality of caches storing the second set of data, wherein the first cache is located in a first availability zone; and
responding to the request for the second set of data, wherein the responding is performed based on retrieving the second set of data from the first cache.

* * * * *